US012441113B2

(12) United States Patent
Sakurai

(10) Patent No.: US 12,441,113 B2
(45) Date of Patent: Oct. 14, 2025

(54) PRINTING APPARATUS AND METHOD FOR CONTROLLING PRINTING APPARATUS

(71) Applicant: CANON KABUSHIKI KAISHA, Tokyo (JP)

(72) Inventor: Norio Sakurai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/353,849

(22) Filed: Jul. 17, 2023

(65) Prior Publication Data

US 2023/0364915 A1 Nov. 16, 2023

Related U.S. Application Data

(63) Continuation of application No. PCT/JP2022/004285, filed on Feb. 3, 2022.

(30) Foreign Application Priority Data

Feb. 12, 2021 (JP) ................................ 2021-020600

(51) Int. Cl.
*B41J 2/17* (2006.01)
*B41J 2/175* (2006.01)

(52) U.S. Cl.
CPC ......... *B41J 2/1707* (2013.01); *B41J 2/17596* (2013.01)

(58) Field of Classification Search
CPC ....... B41J 29/38; B41J 2/14; B41J 2/18; B41J 2/1707; B41J 2/17596; B41J 2/165; B41J 2/175
See application file for complete search history.

(56) References Cited

U.S. PATENT DOCUMENTS

2002/0126175 A1 9/2002 Shima
2005/0195246 A1 9/2005 Ogawa
2012/0050357 A1 3/2012 Rasmussen ....................... 347/6
(Continued)

FOREIGN PATENT DOCUMENTS

CN 1051698 A 5/1991
JP 2002-137379 A 5/2002
JP 2004-058398 2/2004
(Continued)

OTHER PUBLICATIONS

International Search Report and Written Opinion in counterpart International Application No. PCT/JP2022/004285, dated Apr. 5, 2022, with English translation.
(Continued)

*Primary Examiner* — An H Do
(74) *Attorney, Agent, or Firm* — Venable LLP

(57) ABSTRACT

A printing apparatus includes a suction unit configured to suction liquid from an ejection port, a valve provided at a first position in a supply passage and configured to be switchable between an open state in which the supply passage communicates and a closed state in which the supply passage is blocked, and a control unit configured to perform control of first suction in which the valve is set to the open state and the suction unit performs the suction, such that the liquid reaches the first position or a second position downstream of the first position, after the first suction, to perform control of second suction in which the valve is set to the closed state and the suction unit performs the suction, and, after the second suction, to perform control of setting the valve to the open state.

13 Claims, 14 Drawing Sheets

(56) References Cited

U.S. PATENT DOCUMENTS

| | | | | |
|---|---|---|---|---|
| 2015/0273851 | A1 | 10/2015 | Akahane et al. | .... B41J 2/17596 |

FOREIGN PATENT DOCUMENTS

| | | |
|---|---|---|
| JP | 2006-110822 | 4/2006 |
| JP | 2014-043001 | 3/2014 |
| JP | 2019-064273 | 4/2019 |

OTHER PUBLICATIONS

Office Action dated Apr. 8, 2025 in counterpart Japanese Application No. 2021-020600, together with English translation thereof.
Office Action issued Jun. 3, 2025, in corresponding Chinese Application No. 202280013853.1, with English translation (15 pages).
Office Action issued Aug. 26, 2025, in corresponding Japanese Application No. 2021-020600 with English translation (6 pages).

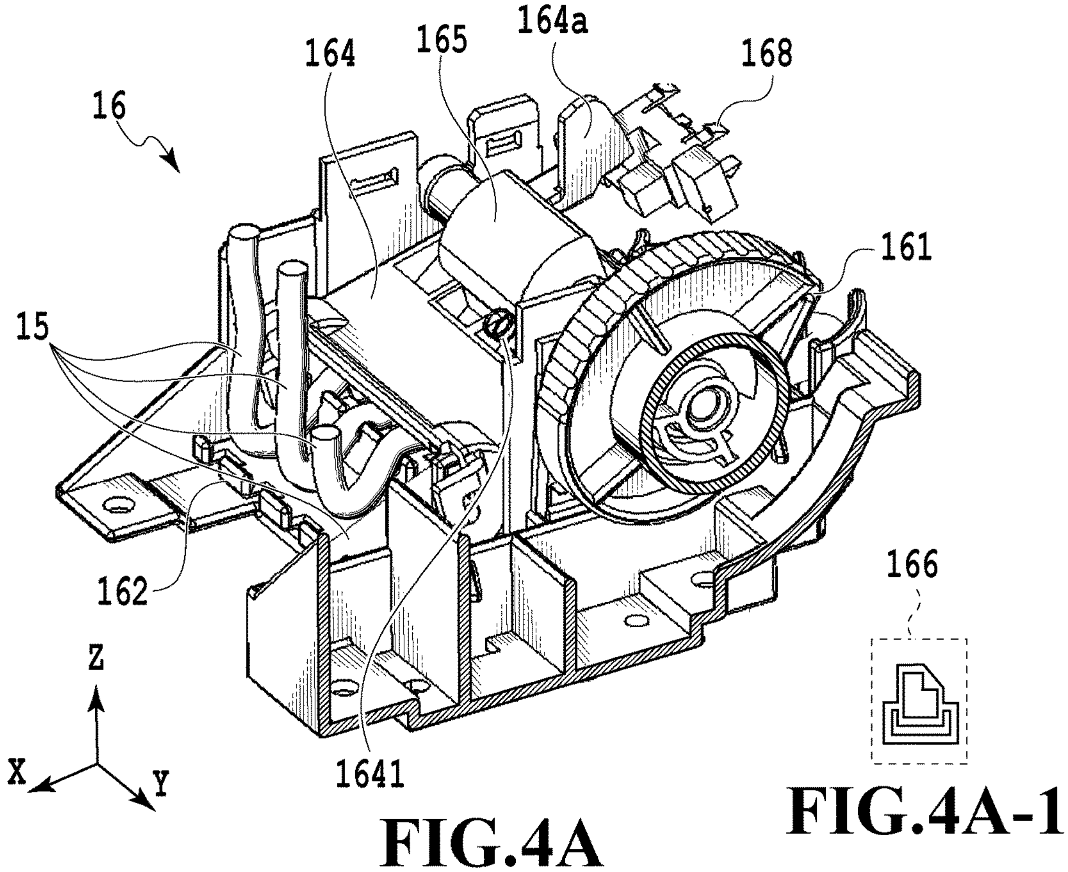
FIG.4A
FIG.4A-1
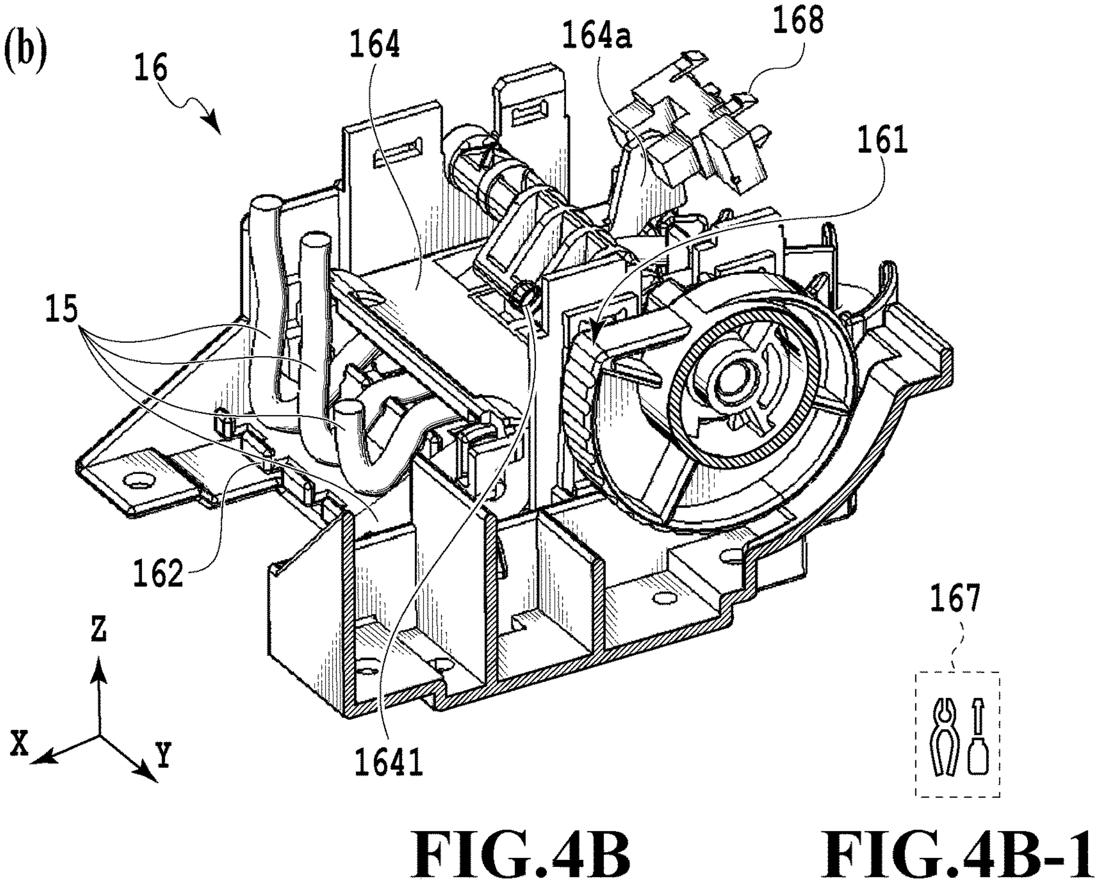
FIG.4B
FIG.4B-1

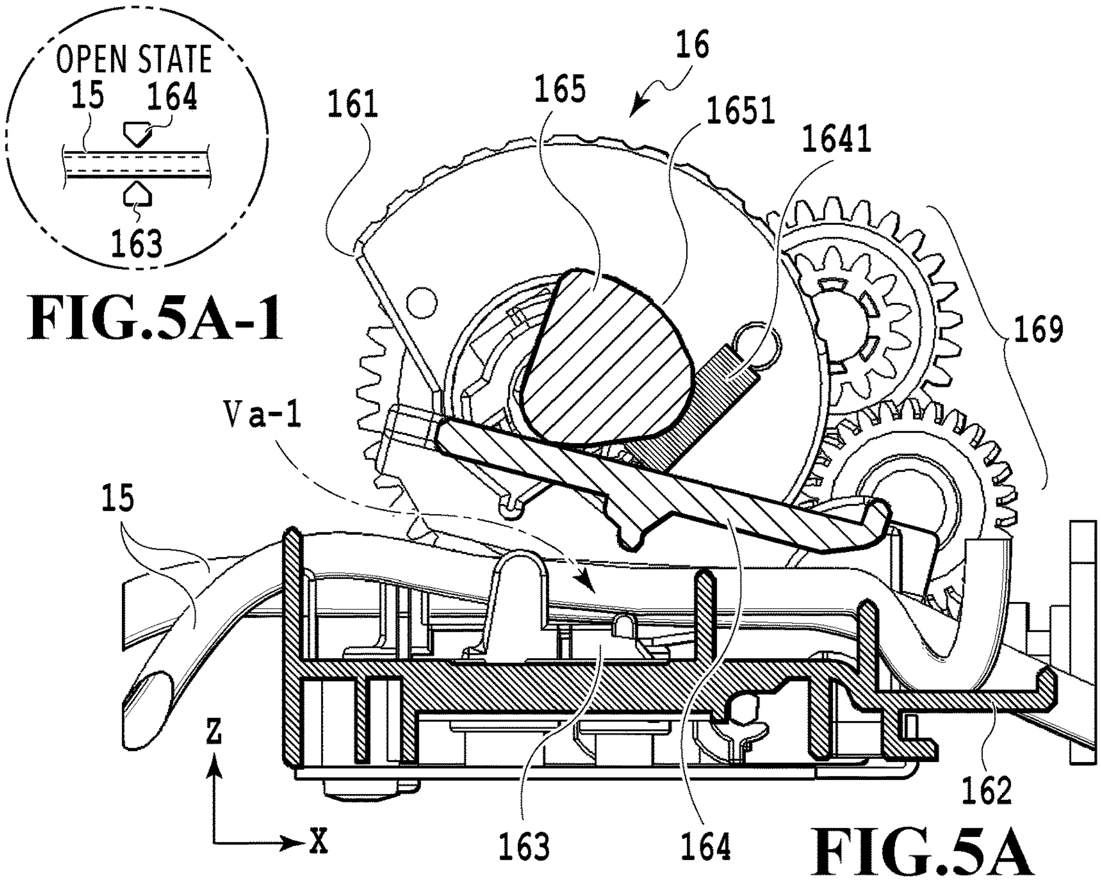
FIG.5A-1
FIG.5A
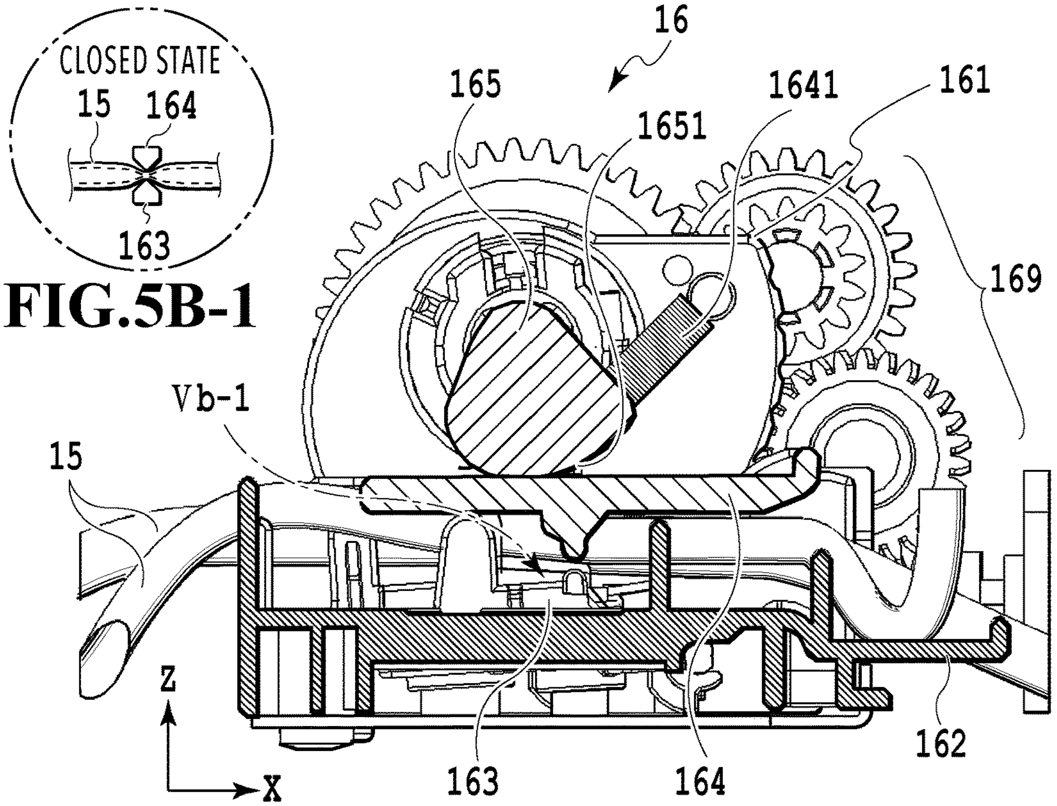
FIG.5B-1
FIG.5B

PRINTING APPARATUS AND METHOD FOR CONTROLLING PRINTING APPARATUS

CROSS-REFERENCE TO RELATED APPLICATIONS

This application is a continuation of International Patent Application No. PCT/JP2022/004285, filed Feb. 3, 2022, which claims the benefit of Japanese Patent Application No. 2021-020600, filed Feb. 12, 2021, both of which are hereby incorporated by reference herein in their entirety.

BACKGROUND

Field

The technique of the present disclosure relates to a printing apparatus and a control method of the controlling printing apparatus.

Background Art

There is a printer in which a choke mechanism is arranged for a supply tube that supplies ink to an ejection head. Japanese Patent Laid-Open No. 2006-110822 describes choke suction in which high negative pressure is generated by performing suction from a nozzle surface of the ejection head with the choke mechanism closed and, then, the choke mechanism is set to an open state to rapidly increase supply pressure of the ink.

Japanese Patent Laid-Open No. 2006-110822

As a method of blocking a flow passage of the ink to perform the choke suction, a method of squashing a tube forming the flow passage of the ink from the outer diameter side and causing portions on the inner diameter side to come into tight contact with each other is conceivable. In a case when the squashing of the tube is canceled, the inner diameter portions of a blocked portion are separated from each other by self-restoring force of the tube. Accordingly, the flow passage can be returned from a blocked state to a communication state. However, in a case when the inner diameter portions of the tube come into tight contact in a dry state, the inner diameter portions of the tube adhere to each other in some cases. In a case when the inner diameter portions of the tube adhere to each other, there is a possibility that the flow passage does not return from the blocked state to the communication state and a trouble may occur.

SUMMARY OF THE INVENTION

A printing apparatus according to the technique of the present disclosure includes a tank configured to contain liquid to be supplied to a printing head that ejects the liquid from an ejection port, a supply passage configured to supply the liquid from the tank to the printing head; a suction unit configured to suction the liquid from the ejection port, a valve provided at a first position in the supply passage and configured to be switchable between an open state in which the supply passage communicates and a closed state in which the supply passage is blocked, and a control unit configured to control the valve and the suction unit, in which the control unit performs control of first suction in which the valve is set to the open state and the suction unit performs the suction such that the liquid reaches the first position or a second position downstream of the first position, after the first suction, performs control of second suction in which the valve is set to the closed state and the suction unit performs the suction, and, after the second suction, performs control of setting the valve to the open state.

Further features of the present disclosure will become apparent from the following description of exemplary embodiments with reference to the attached drawings.

BRIEF DESCRIPTION I/F THE DRAWINGS

Figures 1, 1B:
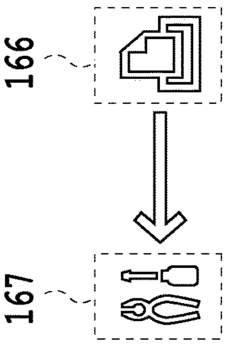
FIGS. 1A, 1B and 1B-1 are perspective views illustrating a state where a cover member of a printing apparatus is opened.
Figure 1B:
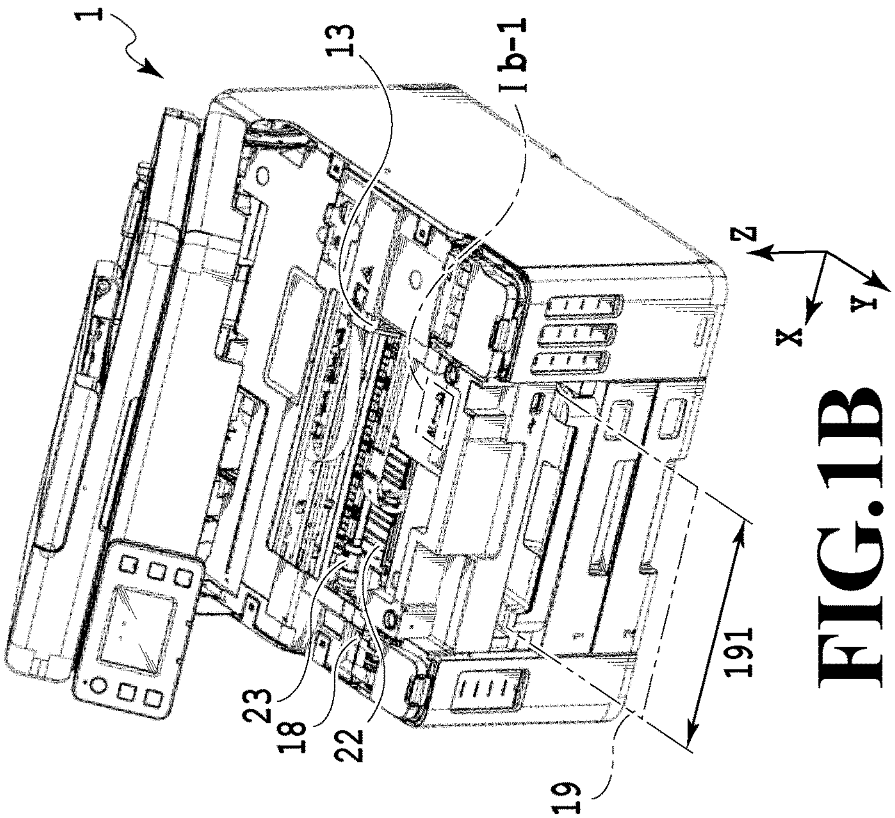
Figure 6:
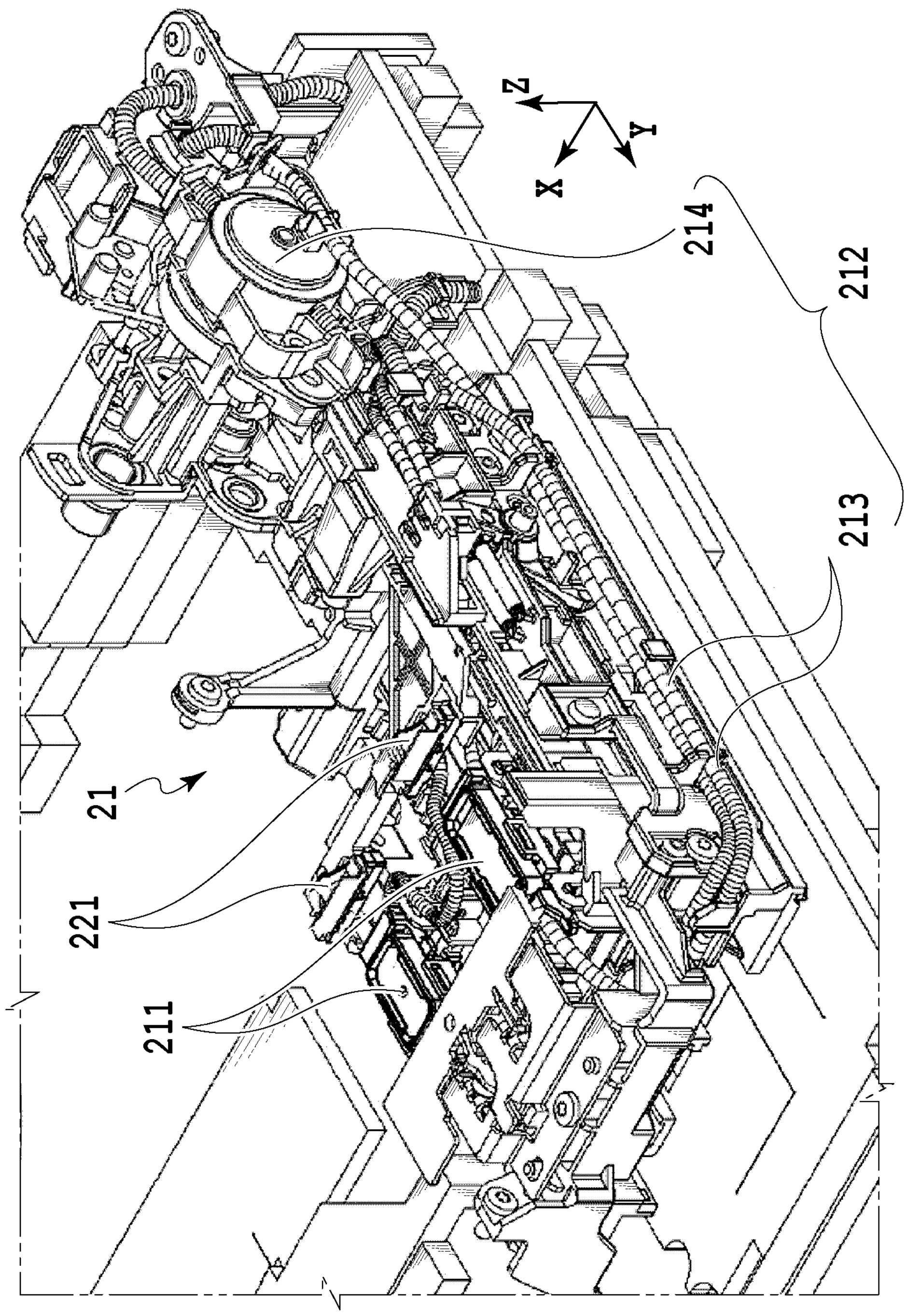
Figure 7:
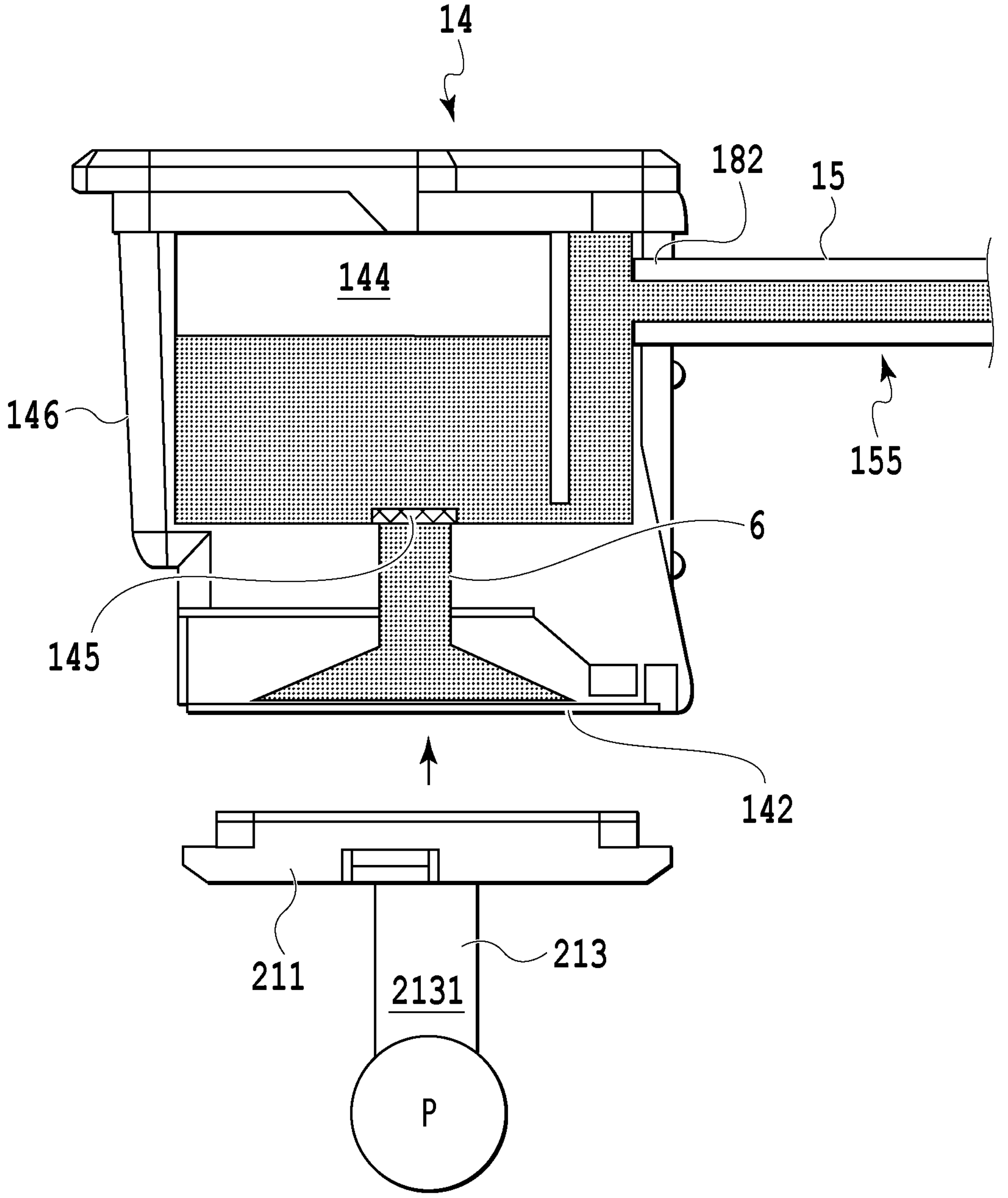
Figure 8:
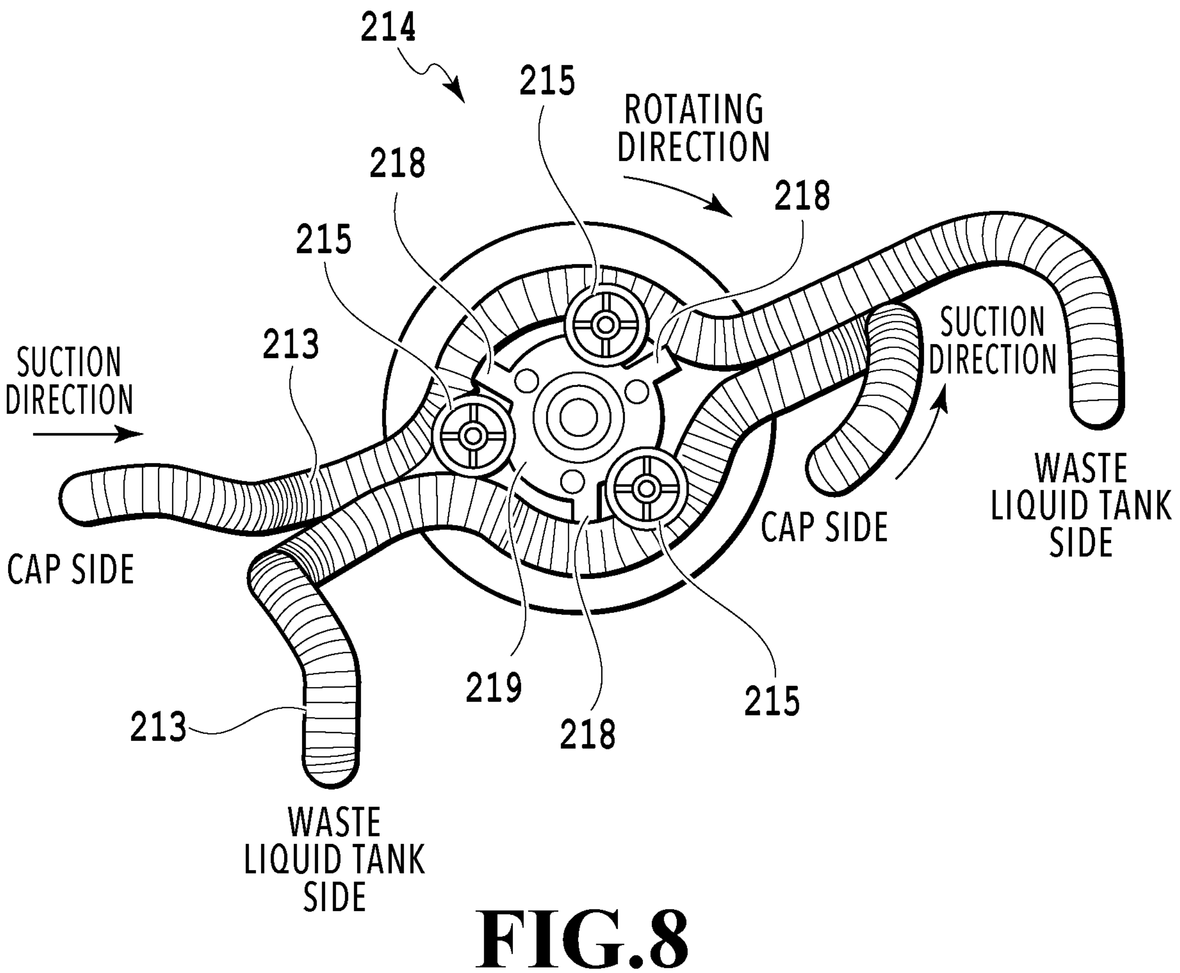
Figure 9:
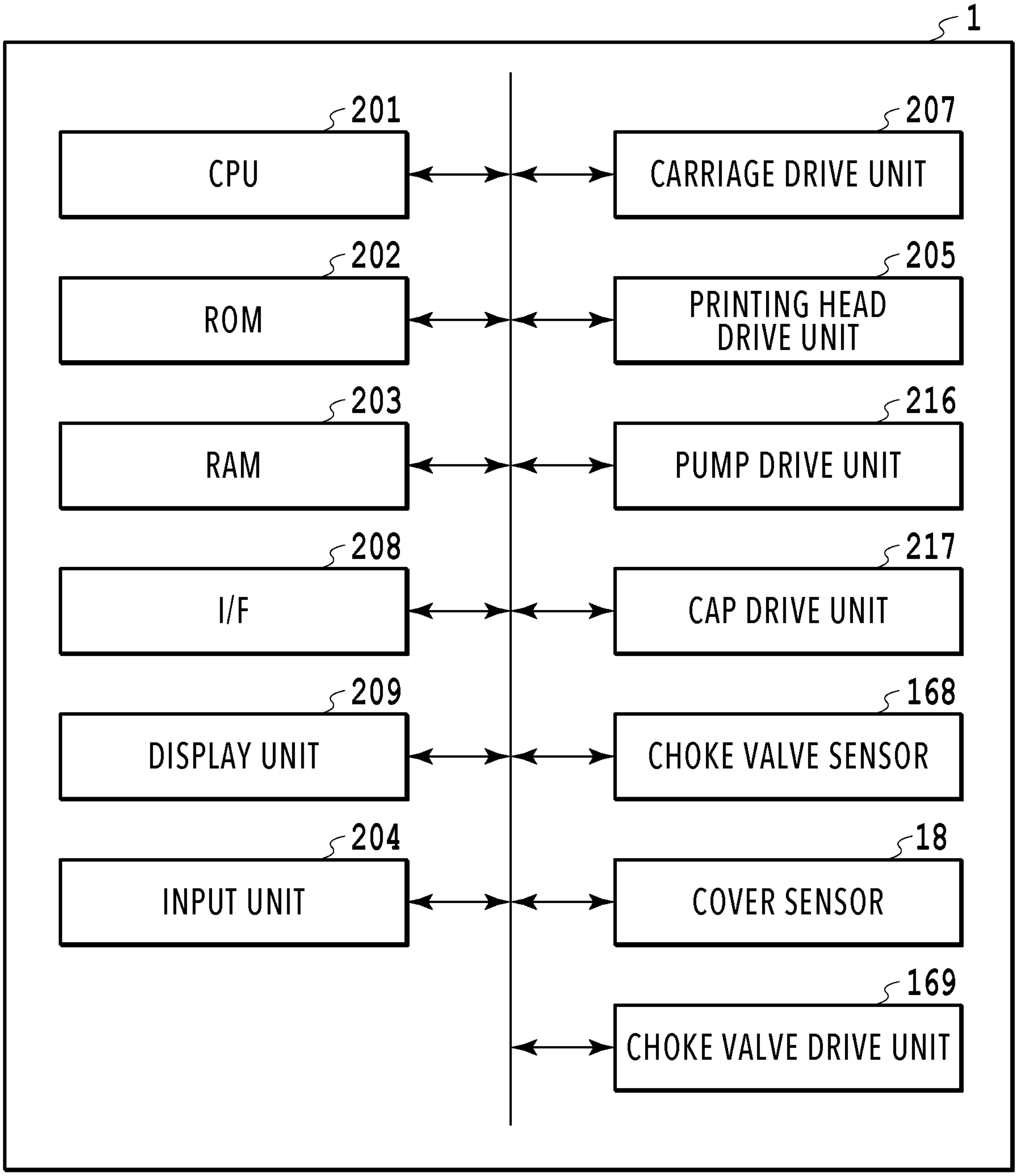
Figure 10:
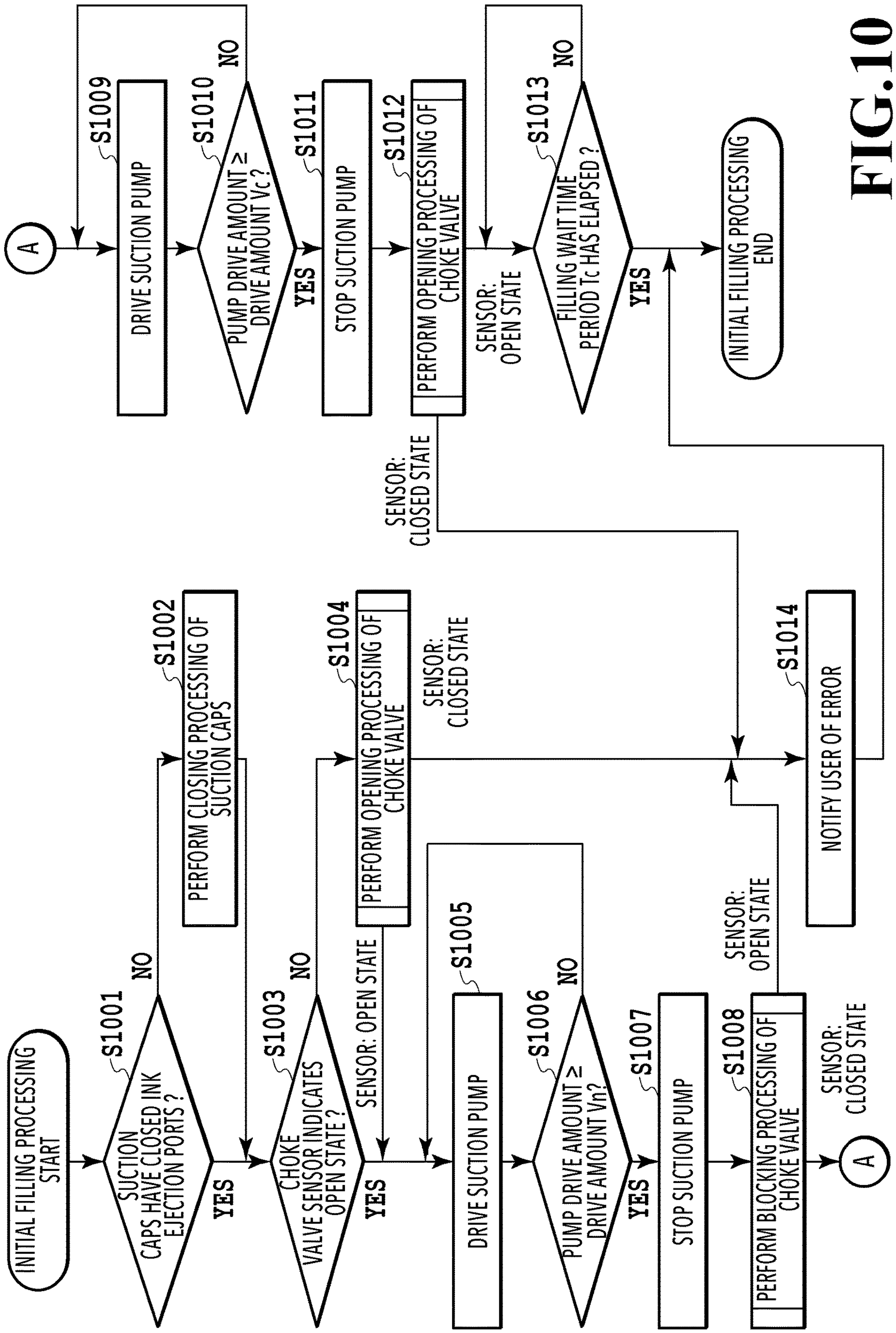
Figure 11B:
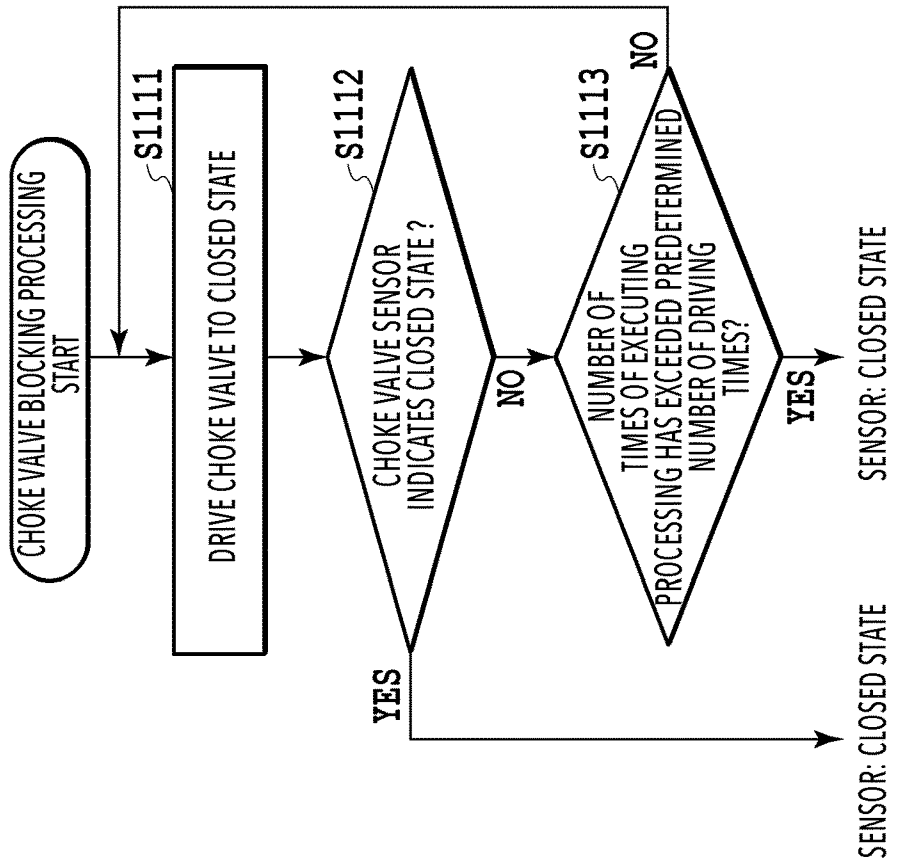
Figure 11A:
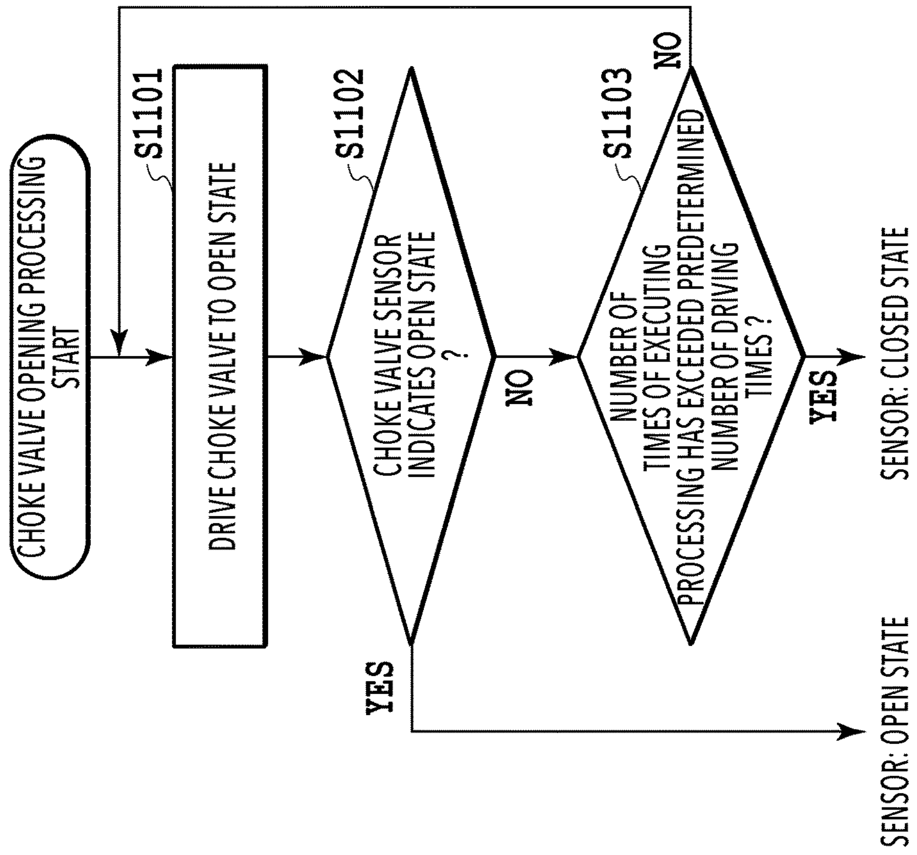
Figure 12A:
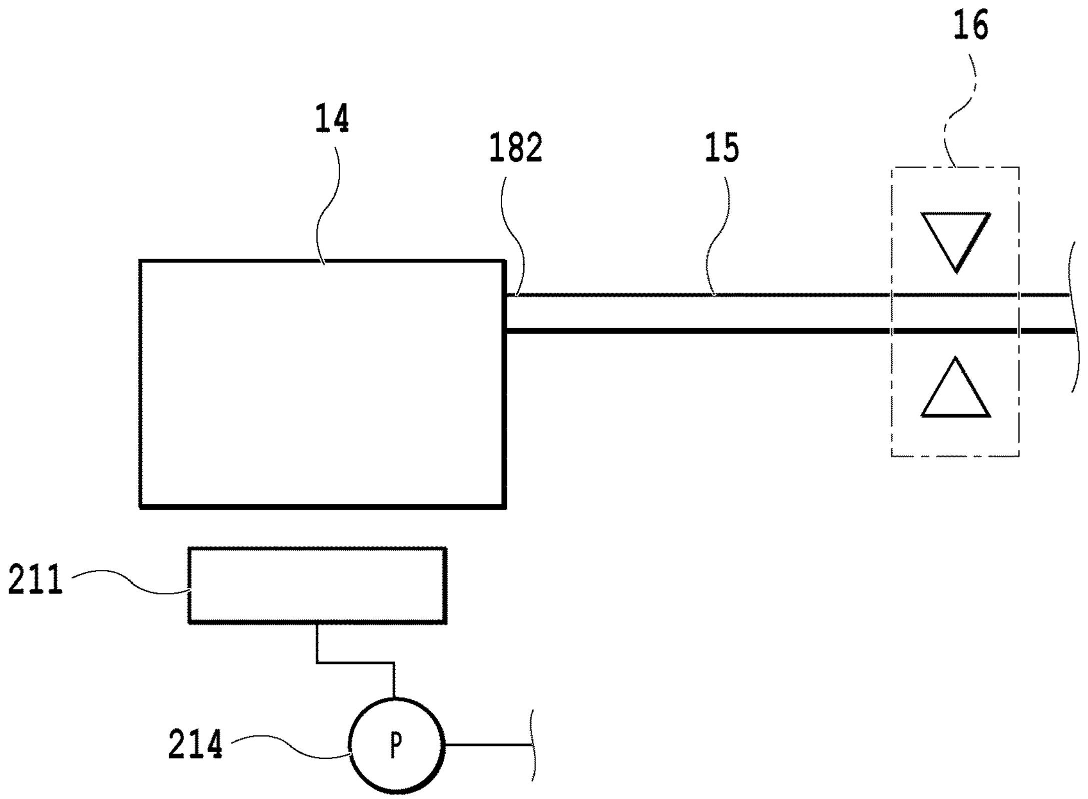
Figure 12B:
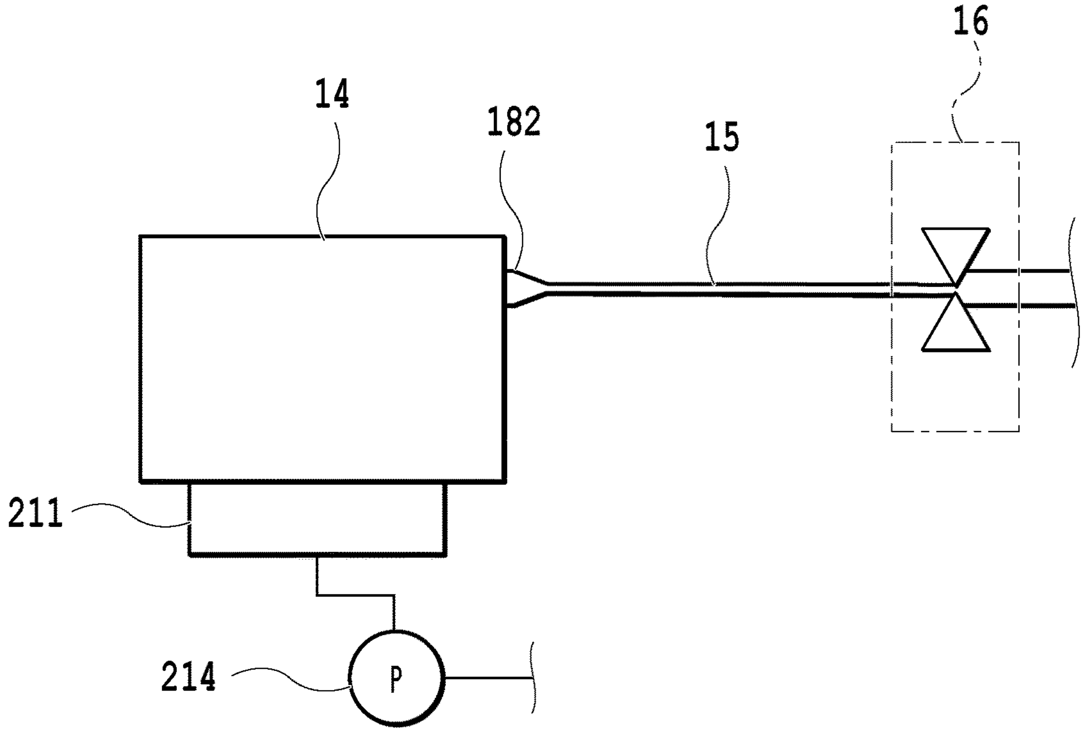
Figure 13:
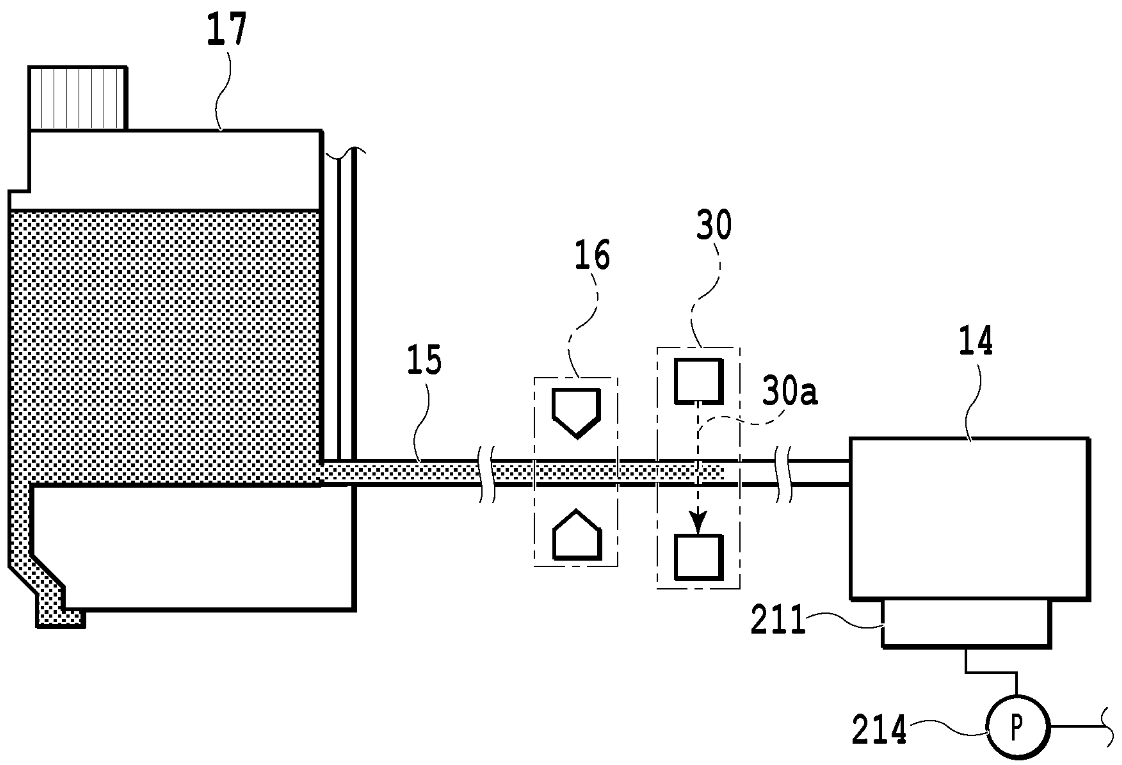

FIGS. 4A, 4B, 4A-1, and 4B-1 are perspective views of a choke valve;

FIGS. 5A, 5B, 5A-1, and 5B-1 are outline cross-sectional views of the choke valve;

FIG. 6 is an outline cross-sectional view of a recovery unit;

FIG. 7 is a schematic diagram of the printing head and a suction cap;

FIG. 8 is an outline view of a suction pump;

FIG. 9 is a diagram illustrating an example of a hardware configuration of the printing apparatus;

FIG. 10 is a flowchart illustrating an example of processing in an ink filling operation;

FIGS. 11A and 11B are flowcharts of choke blocking processing and choke opening processing;

FIGS. 12A and 12B are schematic diagrams of the ink supply passage;

FIG. 13 is a schematic diagram of the ink supply passage; and

Figure 14:
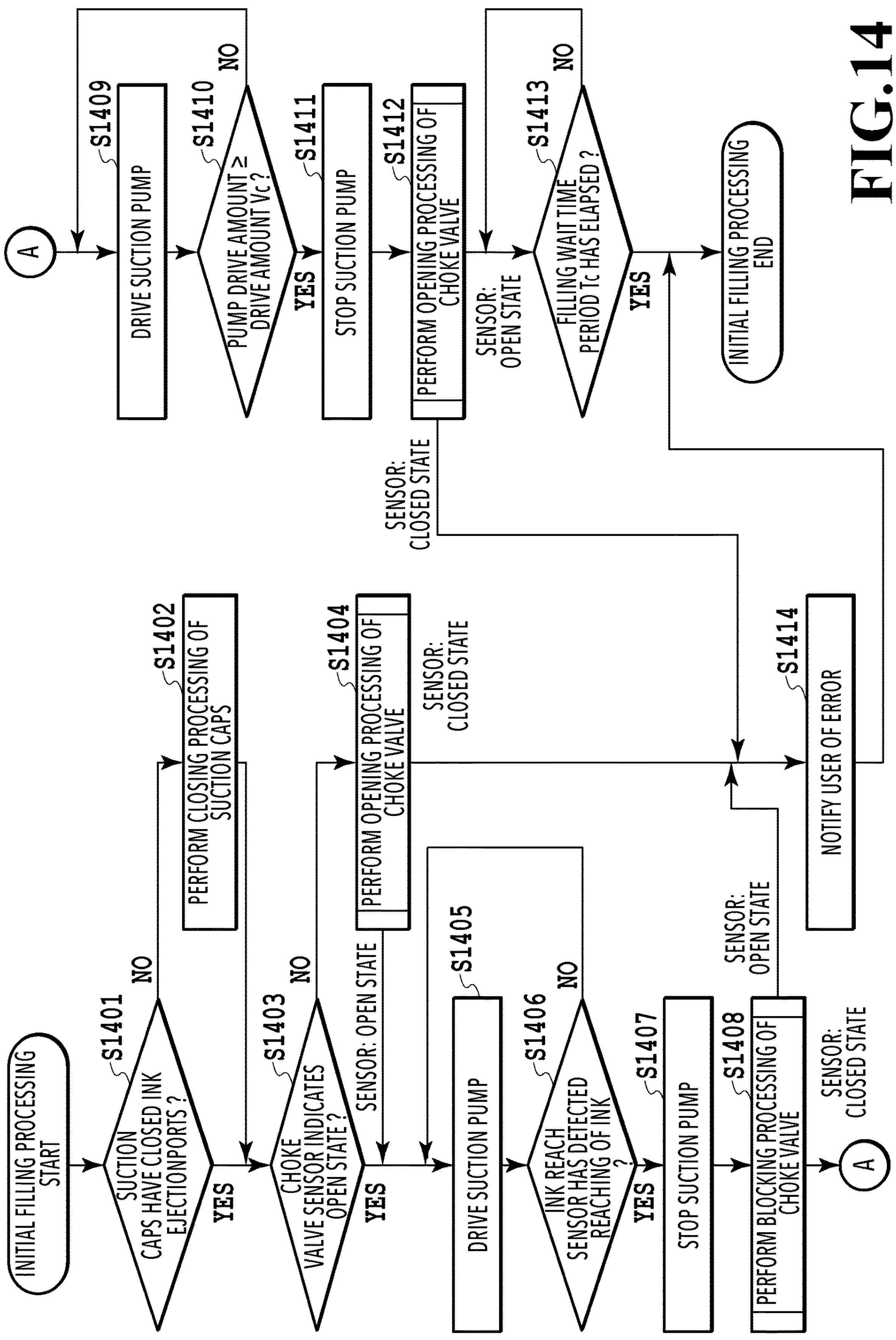

FIG. 14 a flowchart illustrating an example of the processing in the ink filling operation.

DESCRIPTION I/F THE EMBODIMENTS

Embodiments of a technique of the present disclosure are described below with reference to the drawings. The following embodiments do not limit the technique according to the scope of claims. Although multiple features are described in the following embodiments, not all of these multiple features are necessarily essential to the technique of the present disclosure, and the multiple features may be used in any combination. Note that the same or similar configurations are described by being denoted with the same reference numerals, and overlapping description is omitted in some cases.

In the present description, "printing" (also referred to as "character printing" or "printing" in some cases) is not limited to a case when meaningful information such as characters and figures are formed, and the information to be formed may be meaningful or meaningless. The "printing" is assumed to widely mean the case when an image, a design, a pattern, or the like, is formed on a printing medium or the case where the printing medium is processed, irrespective of whether or not the formed or processed objects are made apparent to be visually noticeable to humans.

Moreover, the "printing medium (sheet)" widely includes not only a printing paper used in a general image forming apparatus, but also conveyable media such as cloth, a plastic film (OHP), a metal plate, glass, ceramic, wood, and leather.

Furthermore, "ink" (referred to as "liquid" in some cases) is to be widely interpreted as in the above definition of "printing". The "ink" is assumed to mean liquid that may be used for formation of an image, a design, a pattern, or the like, processing of the printing medium, or treatment of the ink (for example, solidification or insolubilization of a color material in the ink applied to the printing medium) by being applied onto the printing medium.

First Embodiment

[Outline Configuration of Printing Apparatus]

Figure 1A:
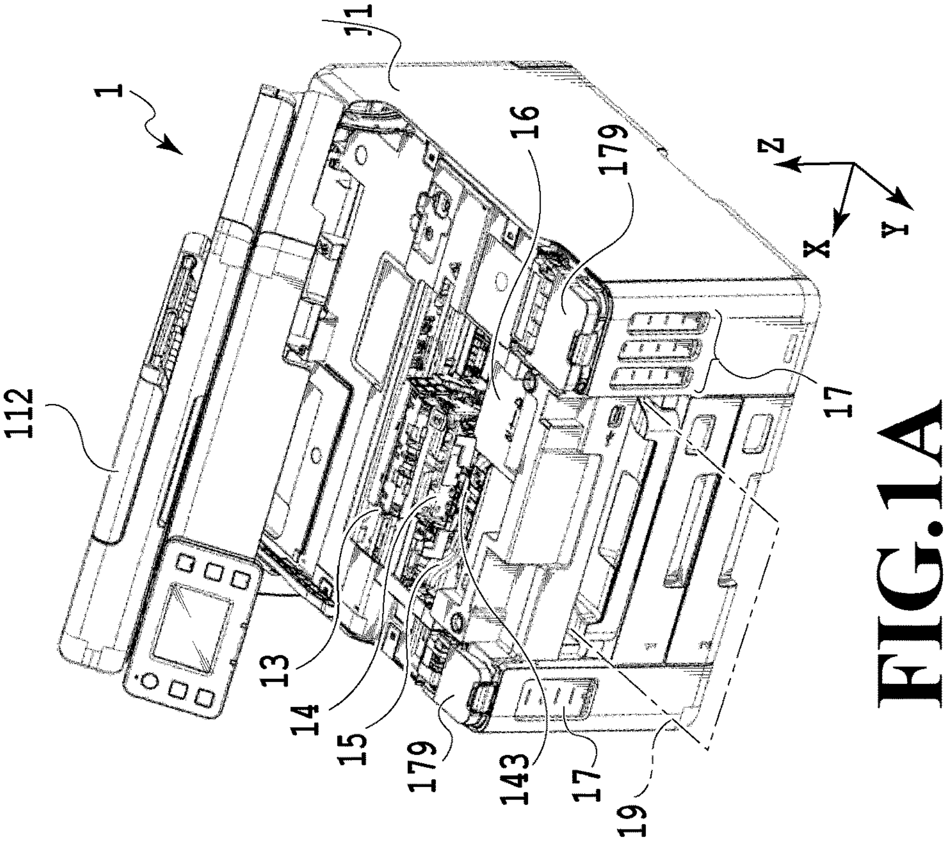

FIGS. 1A and 1B are perspective views illustrating an inkjet printing apparatus 1 (hereafter, printing apparatus 1) according to the present embodiment. FIGS. 1A and 1B both illustrate a state where a cover member 112 to be described later is opened for the convenience of clearly describing an internal configuration. In the present embodiment, the cover member 112 is configured to function as a scanner unit with an ADF. The printing apparatus 1 includes a printing head 14 that ejects inks as liquid to the printing medium and ink tanks 17 that contain the inks to be supplied to the printing head 14. Moreover, the printing apparatus 1 includes supply tubes 15 forming ink supply passages for supplying the inks from the ink tanks 17 to the printing head 14. In the present embodiment, supply tubes 151 to 154 (see FIG. 2) corresponding to multiple ink colors to be described later are collectively described as the supply tubes 15 in some cases. Moreover, the printing apparatus 1 includes a carriage 13 on which the printing head 14 is detachably mounted and that reciprocates. Note that a form in which the printing head 14 is fixed to the carriage 13 may be used.

The printing apparatus 1 includes multiple rollers 23 (some are not illustrated) that feed a sheet-shaped printing medium 19, as a conveyance unit. The multiple rollers 23 convey the printing medium 19 in a conveyance direction (Y direction in the drawings) orthogonal to a main scanning direction (X direction in the drawings) that is a movement direction of the carriage 13 (printing head 14). Moreover, a platen 22 that supports the printing medium 19 is provided below a range where the printing head 14 moves in FIG. 1B, to face the printing head 14. FIG. 1A is a state where the carriage 13 is moving above the platen 22, and FIG. 1B is a state where the carriage 13 is located above suction caps 211 (see FIG. 6) to be described later.

The carriage 13 is provided with a detachment operation unit 143 pivotally supported to be rotatable. The user can detach the printing head 14 from the carriage 13 by operating the detachment operation unit 143. Moreover, a case 11 is provided to entirely cover these internal configuration parts. In a state where the cover member 112 is open, the carriage 13, the printing head 14, the platen 22, the supply tubes 15, and an operation unit 161 (see FIGS. 4A and 4B) of a choke valve to be described later are in a state where they are at least partially exposed. The choke valve 16 is a valve that switches the ink supply passages formed of the supply tubes 15 between a blocked state and a communication state. Details are described later.

Printing medium width 191 indicates width of the printing medium 19 with the maximum size printable by the printing apparatus 1 of the present embodiment. A direction (width direction) in which the printing medium width 191 extends is a direction orthogonal to the conveyance direction of the printing medium 19 by the conveyance unit.

Moreover, the printing apparatus 1 includes a cover sensor 18 that can detect a state of the cover member 112. For example, the cover sensor 18 can detect an open state and a closed state of the cover member 112. Specifically, a protrusion (not illustrated) is provided on the inner side (back side) of the cover member 112, and the cover sensor 18 detects that the cover member 112 is in the closed state in a case when the protrusion is in contact with the cover sensor 18, and detects that the cover member 112 in the open state in a case when the protrusion is not in contact with the cover sensor 18. Moreover, ink tank covers 179 are arranged in upper portions of the ink tanks 17 to cover ink filling ports 176 (see FIG. 2) and ink tank caps 177 (see FIG. 2) and to be capable of being opened and closed by being turned.

Figure 2:
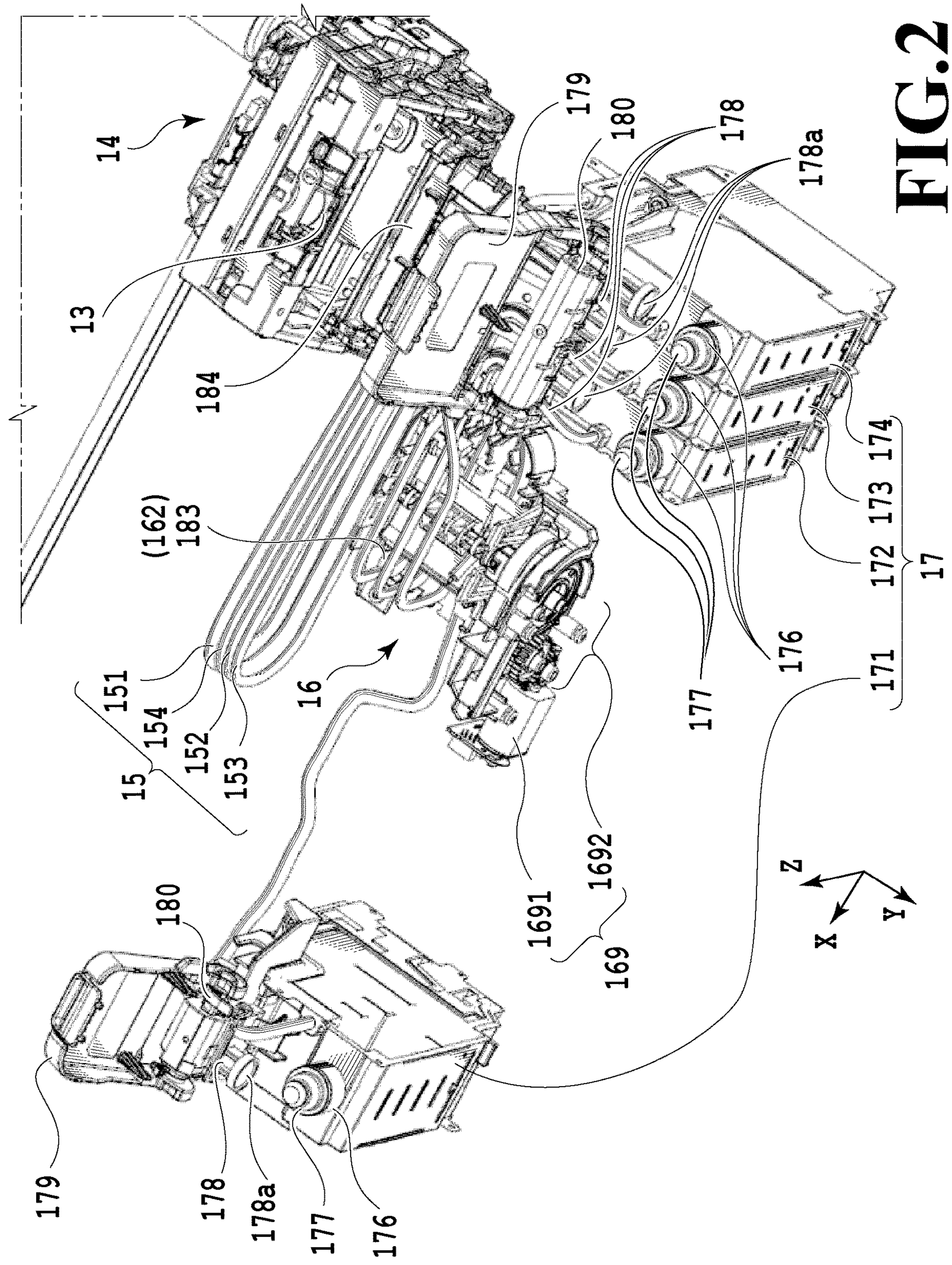
FIG. 2 is a schematic diagram of ink supply passages.

FIG. 2 is a diagram illustrating an outline of the ink tanks 17, the printing head 14, and the supply tubes 15 connecting the ink tanks 17 and the printing head 14. Next, the configurations of the ink tanks 17 and the supply tubes 15 are described. The printing apparatus 1 includes multiple ink tanks 17, respectively, for corresponding ink colors. In the present embodiment, there are provided four ink tanks 17 of a black ink tank 171, a cyan ink tank 172, a magenta ink tank 173, and a yellow ink tank 174. In the present embodiment, the black ink tank 171 is provided on one side of the printing apparatus 1 in the width direction, and the cyan ink tank 172, the magenta ink tank 173, and the yellow ink tank 174 are provided side by side on the other side. Specifically, as illustrated in FIGS. 1A and 1B, the ink tanks are provided such that the printing medium 19 whose printing is completed passes a space between the black ink tank 171 and the set of color ink tanks 172 to 174. Note that the ink tanks 17 is a collective name of the ink tanks of the respective ink colors, and the ink tanks 171 to 174 of the respective ink colors are each assumed to have a configuration of the ink tank 17 described below.

Each of the supply tubes 15 for supplying the corresponding ink to the printing head 14 is attached to the corresponding ink tank 17. In the present embodiment, the supply tube 15 is a supply passage formation member that forms the ink supply passage for supplying the ink from the ink tank 17 to the printing head 14. In the present embodiment, a tube forming the supply tube 15 is made of a flexible material such as rubber or an elastomer, and can be bent with the movement of the printing head 14. Moreover, the ink supply passage can be blocked by squashing a portion of the supply tube 15 with the later-described choke valve 16. The supply tubes 15 are a collective name of the supply tubes 151 to 154 of the respective ink colors to be described later, and the supply tubes 151 to 154 of the respective ink colors are each assumed to have a configuration of the supply tube 15 described below.

To each ink tank 17, there is attached an atmosphere communication tube 178 that allows the interior of the ink tank 17 and the atmosphere to communicate with each other. Moreover, the ink filling port (filling portion) 176 for filling of the ink is provided in an upper portion of the ink tank 17. Furthermore, the ink tank cap 177 for sealing the ink filling port 176 is attached to the ink filling port 176. The user can fill the ink tank 17 with the ink from the ink filling port 176 by removing the ink tank cap 177.

Moreover, the supply tubes 15 and the atmosphere communication tubes 178 are provided with ink tank valves 180 that block communication of the ink or air. In the present embodiment, the ink tank valves 180 are provided on the black side and the color side, respectively.

In a case when the ink tank valve 180 on the black side is closed, communication through each of the ink supply passages formed of the supply tubes 15 connected to the black ink tank 171 and a flow passage in the atmosphere communication tube 178 is blocked. In a case when the ink tank valve 180 on the color side is closed, the ink supply passages formed of the supply tubes 15 connected, respectively, to the cyan ink tank 172, the magenta ink tank 173, and the yellow ink tank 174, and flow passages in the atmosphere communication tubes 178 are blocked.

Figure 3:
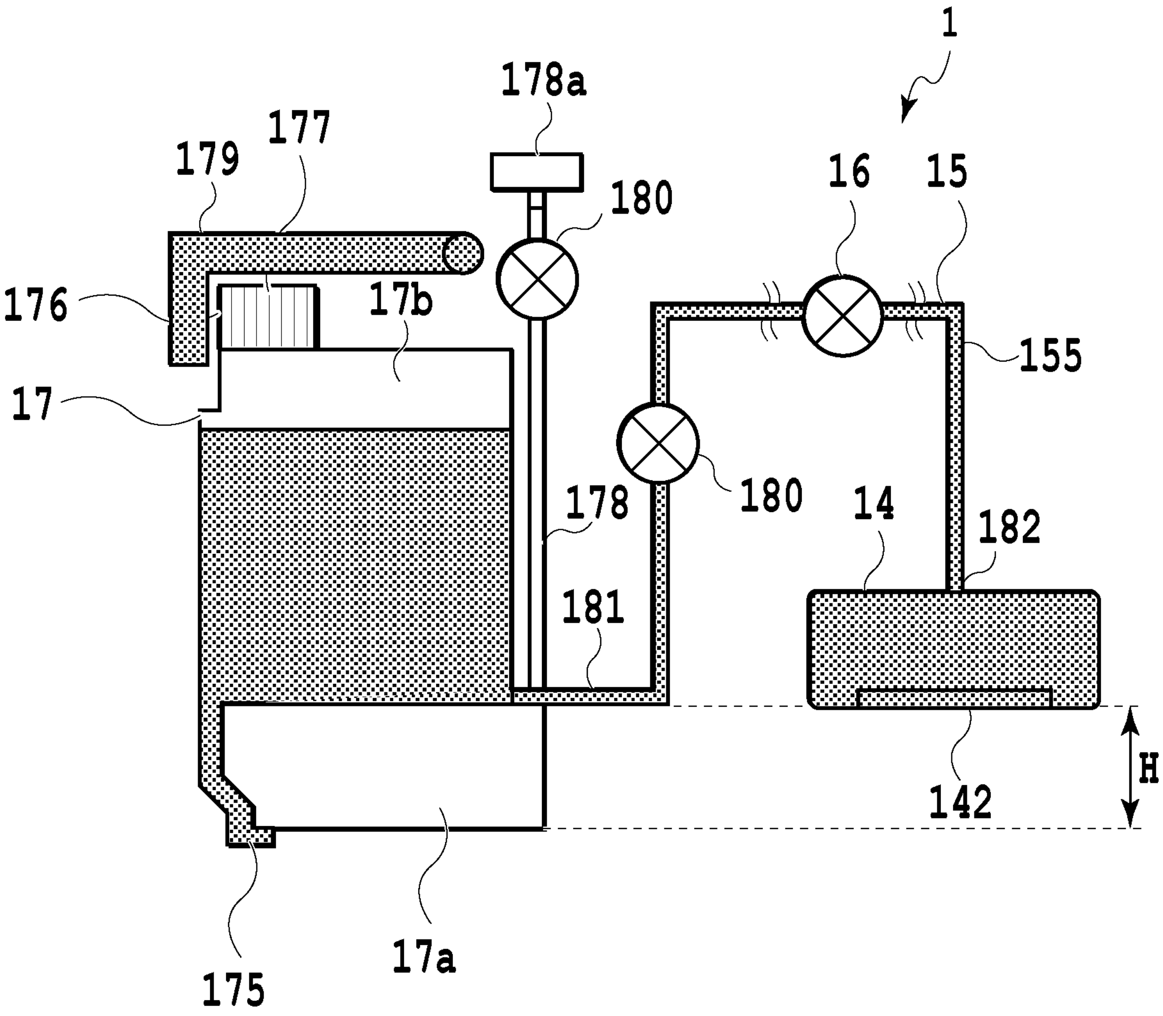
FIG. 3 is a schematic diagram illustrating a positional relationship of an ink tank and a printing head.

FIG. 3 is a schematic diagram illustrating a positional relationship of the ink tank 17, the printing head 14, and ink ejection ports (also referred simply to as nozzles) 142 of the printing head 14. In the printing apparatus 1, an air-liquid exchange unit 175 in which exchange of air and the ink in the ink tank 17 is performed is provided at a position below the ink ejection ports 142 of the printing head 14 by a height H in the height direction to prevent leakage of the ink from the ink ejection ports 142 of the printing head 14. Specifically, the configuration is such that negative pressure generated by a water head difference corresponding to the height H is applied to the ink ejection ports 142. The air-liquid exchange unit 175 is formed to have such an opening area that a meniscus of the ink is maintained. Moreover, a buffer chamber 17*a* is provided in a lower portion of the ink tank 17. The buffer chamber 17*a* can contain the ink that breaks the meniscus in the air-liquid exchange unit 175 and is pushed out in a case when air in an ink containing chamber 17*b* containing the ink expands due to an air pressure change, a temperature change, or the like. The ink can be thereby prevented from leaking from the ink tank 17 through the atmosphere communication tube 178.

Note that the inner volume of the buffer chamber 17*a* is set such that the ink does not reach an end portion of the atmosphere communication tube 178 on the atmosphere side under a normal usage condition. In the present embodiment, an air-liquid separation film 178*a* is provided in the end portion of the atmosphere communication tube 178 on the atmosphere side to allow the air to pass while blocking the ink from the tank side and preventing the ink from leaking to the outside. Various materials that are commercially available can be used as a material of the air-liquid separation film.

Moreover, a joint portion 182 is a member that connects the supply tube 15 and a flow passage of the printing head 14 to each other, and is provided to be detachable from the printing head 14. In a case when the user operates the detachment operation unit 143 in an opening direction to remove the printing head 14 from the carriage 13, the joint portion 182 is disengaged from the printing head 14. The connection between the supply tube 15 and the printing head 14 is thereby cut off. Moreover, in a case when the user mounts the printing head 14 onto the carriage 13, the user performs a closing operation on the detachment operation unit 143 to achieve joint connection between the joint portion 182 and the printing head 14. The joint connection of the joint portion 182 achieves communication between the supply tube 15 and the flow passage of the printing head 14 again, and the ink can be supplied to the printing head 14.

Next, a configuration of an ink supply system according to the present embodiment and a flow up to a point where a printing operation (printing operation) becomes possible are described by using FIGS. 1A, 1B, 2, and 3. In the filling of the ink, the user opens the ink tank cover 179, removes the ink tank cap 177, and fills the ink tank 17 with the ink in an ink bottle, or the like, from the ink filling port 176. In this case, the ink tank valve 180 is closed in conjunction with the opening of the ink tank cover 179, and an ink supply passage 155 and a flow passage in the atmosphere communication tube 178 are blocked.

In a case when the filling of the ink is completed, the user seals the ink filling port 176 with the ink tank cap 177, and closes the ink tank cover 179. In this case, in the closing of the ink tank cover 179, the ink tank valve 180 does not operate in conjunction with the ink tank cover 179, and is left in the closed state. Closing of the cover member 112 switches the ink tank valve 180 from the closed state to the open state, and the communication of the ink supply passage 155 and the flow passage of the atmosphere communication tube 178 is achieved. While the ink tank cap 177 is removed and the ink filling port 176 is open to the atmosphere, the ink tank valve 180 blocks the ink supply passage 155 and the flow passage of the atmosphere communication tube 178.

After detection of ink filling completion, in the printing apparatus 1, the suction caps 211 (see FIG. 6) are pressed against an ejection port surface of the printing head 14, and an ink suction operation including initial filling to be described later can be performed. An interior of the supply tube 15 and an interior of the printing head 14 are filled with the ink through this suction operation. Note that the detection of ink filling completion is performed by detecting the closing of the cover member 112 with the cover sensor 18. Alternatively, there may be employed a form in which a remaining amount detection unit that detects an ink remaining amount of the ink tank 17 is provided, and the ink filling completion is detected by causing the remaining amount detection unit to detect filling of the ink of a predetermined amount or more. In a case when the printing apparatus 1 includes no such detection unit, a configuration in which the user inputs the ink filling completion into the printing apparatus 1 after the ink filling completion may be employed. In a case when the ink is ejected with the printing operation from the ink ejection ports 142 of the printing head 14 that is filled with the ink, negative pressure in the printing head 14 increases by an amount corresponding to a decrease of the ink, and the ink is supplied from the ink tank 17 to the printing head 14. The ink is thereby continuously supplied from the ink tank 17 to the printing head 14 until the ink in the ink tank 17 reaches or falls below a predetermined amount.

[Regarding Choke Valve]

Next, description is given of a configuration of the choke valve 16 that is an opening/closing valve mechanism of the ink supply passages in the present embodiment. First, arrangement of the choke valve 16 according to the present embodiment is described by using FIGS. 1 and 2. The choke valve 16 is provided between the printing head 14 and the ink tank valves 180 of the supply tubes 15. The choke valve 16 is used for switching between an open state in which the ink tanks 17 and the printing head 14 communicate with one another and a closed state in which the ink tanks 17 and the printing head 14 do not communicate with one another. In a case when the choke valve 16 is closed, communication of the ink supply passages 155 formed of the black supply tube 151, the cyan supply tube 152, the magenta supply tube 153, and the yellow supply tube 154 are integrally blocked.

The choke valve 16 can be switched from the state where the ink supply passages 155 communicate (open state) to the state where the ink supply passages 155 are blocked (closed state), by a manual operation by the user, and includes the operation unit 161 (see FIGS. 4A and 4B) for the manual operation by the user. The choke valve 16 is configured to be switchable between the open state and the closed state through the operation unit 161. The operation unit 161 of the choke valve 16 is arranged in a region that is covered with the cover member 112 and that is a region through which the conveyed printing medium 19 passes.

The choke valve 16 is configured to be capable of switching the ink supply passages 155 between the open state and the closed state by automatic control, in addition to the manual operation by the user. A choke valve drive unit 169 drives the operation unit 161 in a similar way to the user operation by being controlled by a CPU 201 (see FIG. 9) that is a control unit. The choke valve drive unit 169 is formed of an electric motor 1691 (see FIG. 2), a reduction gear train 1692 (see FIG. 2), and the like. As described above, the choke valve drive unit 169 is configured to allow both of the drive by the control unit and the drive by the manual operation by the user. Moreover, a print mark 166 and a maintenance mark 167 are arranged at a position denoted by Ib-1 in FIG. 1B. FIG. 1B-1 is an enlarged view of Ib-1.

FIGS. 4A and 4B are perspective views illustrating an outline of the choke valve 16 according to the present embodiment. FIG. 4A is a view in a case when the operation unit 161 is on the side indicated by the print mark 166 illustrated in FIG. 4A-1. In a case when the operation unit 161 is on the side indicated by the print mark 166, the choke valve 16 does not block the ink supply passages 155 and the printing apparatus 1 is in the state where the inks are suppliable from the ink tanks 17 to the printing head 14. Accordingly, the printing apparatus 1 is in a state where it can perform printing on the printing medium 19.

Meanwhile, FIG. 4B is a diagram in a case when the operation unit 161 is on the side indicated by the maintenance mark 167 illustrated in FIG. 4B-1. In a case when the operation unit 161 is on the side indicated by the maintenance mark 167, the choke valve 16 blocks the ink supply passages 155, and no ink is supplied from the ink tanks 17 to the printing head 14. Accordingly, the user can perform replacement work of the printing head 14, transport, and the like, in a state where movement of the inks in the ink supply passages 155 is suppressed. Moreover, the print mark 166 and the maintenance mark 167 allow the user to intuitively recognize the state of the choke valve 16.

FIGS. 5A and 5B are cross-sectional views illustrating the outline of the choke valve 16 according to the present embodiment. FIG. 5A is a cross-sectional view in a case when the operation unit 161 is on the side indicated by the print mark 166. FIG. 5B is a cross-sectional view in a case when the operation unit 161 is on the side indicated by the maintenance mark 167.

As illustrated in FIGS. 5A and 5B, the choke valve 16 includes the operation unit 161, a holding unit 162, receiving members 163, a displacement member 164, a cam 165, and the choke valve drive unit 169 connected to the operation unit 161. The choke valve drive unit 169 is configured to be capable of driving the choke valve 16 via the operation unit 161. Moreover, the operation unit 161 is configured such that the manual operation and the drive by the choke valve drive unit 169 are both possible. Specifically, this is achieved by providing a back-lash (so-called mechanical timer) corresponding to the manual operation in a rotating direction, in a connection portion between the choke valve drive unit 169 and the operation unit 161. The configuration is not limited to that described above, and it is possible to employ, for example, a configuration in which the connection with the choke valve drive unit 169 is temporarily cut by using a clutch mechanism, or the like.

The holding unit 162 holds the supply tubes 15. One ends of the supply tubes 15 are connected to the printing head 14, and the other ends are connected to the ink tanks 17. The supply tubes 15 include bending regions that are bendable with the movement of the printing head 14. The choke valve 16 is arranged such that the bending regions in the supply tubes 15 are located between the printing head 14 and the holding unit 162. Specifically, the choke valve 16 is arranged in regions of the supply tubes 15 that do not move with the movement of the carriage 13. Moreover, as illustrated in FIG. 2, the supply tubes 15 are fixed by a first fixation portion 184 on the printing head 14 side and a second fixation portion 183 on the ink tank 17 side. In the present embodiment, the holding unit 162 also serves as the second fixation portion 183.

The displacement member 164 is a member that can be displaced in a direction in which the displacement member 164 interferes with the supply tubes 15. Specifically, the displacement member 164 is provided to be rotatable in a blocking or an opening direction while turning about its rotation axis toward the supply tubes 15. Moreover, the receiving members 163 are members for receiving the displacement member 164 that is displaced in the direction in which the displacement member 164 interferes with the supply tubes 15. The receiving members 163 are provided on the opposite side of the supply tubes 15 to the side on which the displacement member 164 is provided. The displacement member 164 squashes the supply tubes 15 while pressing the supply tubes 15 against the receiving members 163, and the ink supply passages 155 are thereby blocked. Specifically, a description is given assuming that the choke valve of the present embodiment employs a so-called pinch valve method.

The receiving members 163 are formed independently for the respective tubes as movable members biased by biasing members having loads sufficient for blocking of the tubes. Employing such a movable configuration on the receiving member 163 side enables management of suitable pressing force corresponding to variation in an outer diameter and thickness among the multiple tubes even in a case when the displacement member 164 is a single-piece member. Accordingly, reliability of the blocking and opening operations by the choke valve 16 can be improved.

The cam 165 comes into contact with the displacement member 164, and displaces the displacement member 164 in a substantially downward direction (−Z direction) in FIGS. 5A and 5B. In the present embodiment, the cam 165 integrally rotates with the operation unit 161, and a cam surface 1651 comes into contact with the displacement member 164. In a case when the operation unit 161 is operated by the user or driven by the choke valve drive unit 169, the cam 165 rotates with the operation or the drive. Then, the displacement member 164 pressed by the cam surface 1651 is displaced in the substantially downward direction (−Z direction) in FIGS. 5A and 5B, and the ink supply passages 155 are thereby blocked.

In a case when the ink supply passages 155 are to be returned from the blocked state to the communication state, the cam surface 1651 rotates in such a direction that the pressing of the displacement member 164 is canceled and the displacement member 164 gradually moves away. Then, a reaction force received from the squashed supply tubes 15 and a biasing member 1641 that biases the displacement member 164 in a substantially upward direction (+Z direction) in FIGS. 5A and 5B causes the displacement member 164 to follow the cam surface 1651 and retreat upward. As described above, it is possible to switch between the state where the choke valve 16 blocks the supply tubes 15 and the state where the supply tubes 15 are open, through the operation unit 161.

FIGS. 4A and 5A illustrate a state where the displacement member 164 is not squashing the supply tubes 15 and the ink supply passages 155 are in the communication state. At this moment, the operation unit 161 is located on the side indicated by the print mark 166. In this state, as illustrated in FIG. 5A-1, the inks in the supply tubes 15 can be supplied from the ink tanks 17 to the printing head 14 via the ink supply passages 155. In a case when the operation unit 161 is rotated in this state toward the side indicated by the maintenance mark 167 as illustrated in FIG. 4B, the cam surface 1651 of the cam 165 that integrally rotates with the choke valve 16 as described above also rotates. Then, the cam surface 1651 displaces the displacement member 164 in the direction in which the displacement member 164 interferes with the supply tubes 15.

FIGS. 4B and 5B illustrate a state where the displacement member 164 is squashing the supply tubes 15 and the ink supply passages 155 are blocked. As illustrated at in FIG. 5B-1, the supply tubes 15 are squashed between the displacement member 164 and the receiving members 163, and the ink supply passages 155 of the supply tubes 15 are blocked. In this case, the supply tubes 15 are in a state where the inks in the ink tanks 17 cannot be supplied to the printing head 14. Although a case when the choke valve 16 is manually operated by the user is sometimes described in the present embodiment, actions are the same also in the case of the driving by the choke valve drive unit 169. In a case when the choke valve drive unit 169 performs the driving by being controlled by the CPU 201, the user does not have to open the cover member 112 and operate the operation unit 161.

Moreover, in the present embodiment, closing of the choke valve 16 simultaneously blocks the ink supply passages 155 of the supply tubes 15 for all ink colors. However, there may be employed a form in which multiple choke valves 16 are provided for the respective supply tubes 15 of the respective ink colors, and each of the ink supply passages 155 can individually blocked. Moreover, the choke valves 16 may be separately provided on the black side and the color side, respectively.

The operation unit 161 is arranged at a position where the operation unit 161 is covered with the case 11 and the cover member 112. Specifically, the operation unit 161 is provided to be exposed in a case when the cover member 112 is opened. The printing apparatus 1 is controlled not to perform the printing operation by the printing head 14 while the open state of the cover member 112 is detected by the cover sensor 18. Providing the operation unit 161 inside the cover member 112 can suppress a case when the user erroneously operates the operation unit 161 during the printing operation of the printing apparatus 1, or the like.

Moreover, in the present embodiment, since the cover sensor 18 is provided, the printing apparatus 1 can detect whether the printing apparatus 1 is in a state where the user can operate the operation unit 161, by using the cover sensor 18. The cover sensor 18 is not limited to a mechanical sensor that detects mechanical contact, and may be, for example, an optical sensor, or the like.

Furthermore, as illustrated in FIGS. 4A and 4B, the choke valve 16 is provided with a choke valve sensor 168 that detects open and closed states of the choke valve 16. Description is given assuming that the choke valve sensor 168 of the present embodiment is an optical sensor. In a case when the operation unit 161 rotates, the displacement member 164 is pressed by the cam 165, and a flag 164*a* provided in the displacement member 164 blocks or opens up the light axis center of the choke valve sensor 168. The choke valve sensor 168 thereby detects whether the choke valve 16 is in the open state or the closed state. Note that a switch using a mechanical electrical contact or other well-known configurations can be employed in the choke valve sensor 168.

[Regarding Recovery Unit]

FIG. 6 is a perspective view illustrating an outline of a recovery unit 21. In the present embodiment, the printing apparatus 1 includes the recovery unit 21 for maintaining or recovering an ejection performance (printing performance) of the printing head 14. In the present embodiment, the recovery unit 21 is provided in an interior of a main body of the printing apparatus 1 covered with the case 11. The recovery unit 21 includes the suction caps 211 that cap the printing head 14 and a suction mechanism 212 that sucks the inks in the suction caps 211. The suction mechanism 212 includes suction tubes 213 that are connected to the suction caps 211 and a suction pump 214 that sucks the inks in the suction caps 211 via the suction tubes 213. In this case, the suction tubes 213 are suction passage formation members that form ink suction passages 2131 (see FIG. 7) for sucking the inks in the suction caps 211. Moreover, in the present embodiment, the suction tubes 213 are formed of flexible members such as rubber or an elastomer as with the supply tubes 15.

Moreover, the recovery unit 21 includes wipers 221 for wiping the ejection port surface of the ink ejection ports 142, a holding member (not illustrated) that holds the wipers 221, an ink removal member (not illustrated) for removing the inks attached to the wipers 221, and the like.

FIG. 7 is a diagram schematically illustrating the printing head 14 and the suction cap 211. In FIG. 7, the supply tube 15 is coupled to a right surface portion of the printing head 14. Moreover, the suction cap 211 is provided to be capable of being advanced toward and retreated from the ink ejection ports 142 of the printing head 14 by a cap drive unit 217 (see FIG. 9), and can cap the ejection port surface on which the ink ejection ports 142 are provided from below. An interior of the printing head 14 is not completely filled with the ink, and an air layer 144 is always present. Note that the suction cap 211 is provided at a predetermined position in the printing apparatus 1 and, in execution of the suction operation, the printing head 14 is moved by the carriage 13 to be located at a recovery position above the suction cap 211.

A sub-tank 146, in which the ink supplied from the supply tube 15 via the joint portion 182 is accumulated, is arranged inside the printing head 14. A flow passage 6 communicating with the ink ejection ports 142 is arranged below the sub-tank 146 with a filter 145 provided between the flow passage 6 and the sub-tank 146. Providing the sub-tank 146 in the printing head 14 allows a relatively large amount of ink to be supplied in a short period, and is thus a configuration suitable for, for example, high-speed printing.

The filter 145 is provided to prevent solid objects such as foreign objects in the supplied ink from entering the ink ejection port 142 side, and the ink can pass through the filter 145. The filter 145 is a sheet-shaped member having a fine mesh required to trap foreign objects, and a description is given assuming that the filter 145 of the present embodiment is formed of a net-shaped member made of corrosion resistant stainless steel. Alternatively, various members such as, for example, net-shaped members made of other metals and a non-woven fabric made of a resin can be used as the member forming the filter 145 within a scope in which a purpose of the filter can be achieved.

FIG. 8 is a cross-sectional view illustrating an outline of the suction pump 214. The suction operation of the inks in the suction caps 211 by the suction mechanism 212 is described by using FIG. 8. In the present embodiment, the suction mechanism 212 includes two suction tubes 213 for black and color.

The suction pump 214 includes rollers 215, a pump drive unit 216 (see FIG. 9) that includes an electric motor, or the like, and that is driven to rotate, and a rotating member 219 that rotates with the rotation of the pump drive unit 216. The suction pump 214 also includes roller drive members 218 provided to protrude outward from the rotating member 219 in a radial direction.

The rollers 215 are provided to revolve around a rotation axis of the rotating member 219. In a case when the rotating member 219 rotates, the roller drive members 218 revolve about the axis of the rotating member 219. Then, in a case when the roller drive members 218 revolve about the axis of the rotating member 219 with the roller drive members 218 in contact with the rollers 215, this causes the rollers 215 to revolve about the axis of the rotating member 219. Then, in a case when the rollers 215 revolve around the rotating member 219 and squeeze the suction tubes 213 with the ink ejection ports 142 covered with the suction caps 211, this generates negative pressure inside the suction caps 211, and the suction mechanism 212 thereby performs suction.

In the present embodiment, the two suction tubes 213 are provided side by side in the vertical direction with the rotating member 219 arranged between the suction tubes 213. Moreover, in the present embodiment, three rollers 215 are provided, and the three rollers 215 rotate and squeeze the two suction tubes 213 sequentially to perform suction of the two suction tubes 213 simultaneously.

Moreover, one end of each suction tube 213 is connected to a waste liquid tank (not illustrated), and the inks suctioned by the suction pump 214 are discharged to the waste liquid tank via the suction tube 213.

Furthermore, in the present embodiment, the suction pump 214 can block the ink suction passages 2131 by stopping the drive of the pump drive unit 216 (see FIG. 9) in a state where the rollers 215 are squashing the suction tubes 213. Specifically, in the present embodiment, it can be said that the suction pump 214 also serves as a blocking valve of the ink suction passages 2131. Since the suction pump 214 for the recovery operation included in the printing apparatus 1 also serves as the blocking valve of the ink suction passages 2131, the number of parts in the printing apparatus 1 can be reduced. The configuration may be such that a blocking valve of the ink suction passages 2131 is included separately from the suction pump 214. In this case, it is possible to employ valves of various configurations such as a valve that allows both of manual operation and automatic control similar to the choke valve 16 and a valve that can be automatically opened and closed by a drive source such as a motor.

[Hardware Configuration]

FIG. 9 is a block diagram for explaining a configuration of the printing apparatus 1 in the present embodiment. The printing apparatus 1 includes the CPU 201, a ROM 202, a RAM 203, a display unit 209, an input unit 204, a carriage drive unit 207, a printing head drive unit 205, the pump drive unit 216, and the cap drive unit 217. The printing apparatus 1 also includes the choke valve sensor 168, the cover sensor 18, the choke valve drive unit 169, and an I/F 208.

The CPU 201 is a control unit that integrally controls the printing apparatus 1. The ROM 202 stores a control program of the CPU 201, various pieces of data, and the like. The RAM 203 temporarily stores various pieces of data. For example, the CPU 201 reads out a program stored in the ROM 202 to the RAM 203, and executes the program to execute operation control and data processing of the printing apparatus 1. Moreover, the CPU 201 transmits a control signal to the printing head 14, and the printing head 14 ejects the inks to the printing medium 19 according to the transmitted control signal. Furthermore, the CPU 201 transmits control signals to the carriage drive unit 207, the pump drive unit 216, and the cap drive unit 217 to perform recovery control of the printing head 14. Moreover, detection results of the cover sensor 18 and the choke valve sensor 168 are transmitted to the CPU 201. The CPU 201 can thus determine whether each of the cover member 112 and the choke valve 16 is in the open state or the closed state.

The external I/F 208 is connected to a PC, or the like, to receive printing data and the like and to transmit status signals, and the like.

The display unit 209 displays various user interface screens such as apparatus information, a setting screen, and job information. The display unit 209 is formed of, for example, a liquid crystal display. For example, the display unit 209 is provided at a position in a main body 111 of the case 11 that is easily visible to the user. The input unit 204 receives inputs made by the user. For example, the input unit 204 may be a touch panel or hard keys.

The carriage drive unit 207 includes, for example, a motor, and moves the carriage 13 by using a control signal transmitted from the CPU 201 via a not-illustrated motor driver. In this case, for example, a not-illustrated a rack-and-pinon mechanism, or the like, converts a rotating motion of the motor to a reciprocating motion. The pump drive unit 216 includes, for example, a motor, and drives the suction pump 214 according a control signal transmitted from the CPU 201 via a not-illustrated motor driver. The cap drive unit 217 includes, for example, a motor, and drives the suction caps 211 according to a control signal transmitted from the CPU 201 via a not-illustrated motor driver. In this case, for example, a not-illustrated rack-and-pinion mechanism or the like converts a rotating motion of the motor to a reciprocating motion.

The choke valve drive unit 169 includes, for example, the electric motor 1691 (see FIG. 2), the reduction gear train 1692 (see FIG. 2), and the like, and switches the choke valve 16 between the open state and the closed state according to a control signal transmitted from the CPU 201 via a not-illustrated motor driver.

Note that FIG. 9 is an outline diagram for explaining parts relating to a configuration relating to choke suction of the present embodiment, and the printing apparatus 1 may include other configurations.

[Action of Printing Apparatus]

The initial filling that is executed before first use of the printing apparatus 1 is described. The initial filling is a preparation operation of filling the printing apparatus 1 with the inks to set the printing apparatus 1 after shipping to a printable state. Since the printing apparatus 1 of the present embodiment is filled with no ink at the shipping, the initial filling is necessary for the operation of the printing apparatus 1.

In order to accumulate a sufficient amount of inks in the sub-tanks 146 in the printing head 14 after the filling of the ink tanks 17 with the inks, it is preferable to fill the sub-tanks with the inks from the main tanks by performing choke suction described below.

In the choke suction, the choke valve 16 is set to the closed state, and then the suction is performed on the ink ejection port 142 side of the printing head 14, from the suction caps 211. This suction applies relatively high negative pressure of, for example, −80 kPa from the ink ejection ports 142. Then, the choke valve 16 is set to the open state to discharge bubbles (air) in flow passages including the sub-tanks 146 in the printing head 14, and the sub-tanks 146 are filled with the inks. Applying high negative pressure from the suction caps 211 reduces the pressure of the air layer 144 in each sub-tank 146. Accordingly, after the choke suction, air is replaced by the ink by an amount corresponding to reduction in the volume of the air layer 144, and a sufficient amount of ink is resultantly accumulated in each sub-tank 146. Note that the air layer 144 does not completely disappear even after the choke suction.

In a case when the suction from the suction caps 211 on the ink ejection port 142 side of the printing head 14 with the choke valve 16 left in the open state and with the ink supply passages unblocked (hereafter, referred to as normal suction) is performed, negative pressure as in the choke suction is not generated. For example, negative pressure of only about −30 kPa is generated in the normal suction. Accordingly, filling of the sub-tanks 146 with the inks may be insufficient by the normal suction alone.

The choke valve 16 is a type of valve that squashes part of the flow passages formed by the supply tubes 15 from the outer diameter side and causes portions on the inner diameter side of the supply tubes 15 to come into tight contact with each other to block the flow passages and that cancels the squashing to open the flow passages. In a case when the squashing of the supply tubes 15 by the choke valve 16 is canceled, the inner diameter tight contact portions in the blocked portion are separated from each other by self-restoring force of the supply tubes 15, and the blocking of the supply tubes 15 is opened up.

The supply tubes 15 are generally made of a soft material such as rubber or an elastomer in many cases. However, the self-restoring force of the supply tubes 15 tends to be low in a case when the tubes are soft. Moreover, the soft material as described above has adhesiveness, and tends to adhere to opposite surfaces in the tight contact portions in the blocking. Accordingly, an opening time period from the canceling of the closed state of the choke valve 16 to the open state as a valve tends to be long depending on the self-restoring force and the degree of adherence in the tight contact portions, or a time period to the open state may vary.

The printing apparatus 1 of the present embodiment is shipped in a state where the ink tanks 17, the supply tubes 15, or the printing head 14 are filled with no ink (dry state), for the purposes of avoiding ink leakage in transport, reduction of manufacturing cost, and the like. Accordingly, in a case when the choke valve 16 is set to the closed state to execute the choke suction in the initial filling, there is a possibility that adhering of the blocked portions of the supply tubes 15 occurs on the inner diameter side due to the choke valve 16. In a case when the adhering of the blocked portions of the supply tubes 15 occurs on the inner diameter side, there is a possibility that the closed state cannot be switched to the opened state.

Moreover, in a case when the adhering occurs on the inner diameter side of the tubes, in the filling of the ink in the printing apparatus using multiple color inks, the opening time period it takes for the choke valve 16 to transition from the closed state to the open state varies among the supply tubes 151 to 154. In a case when the opening time period varies, the ink in the supply tube that has transitioned to the open state first arrives to the ink ejection ports 142 configured to eject this ink first. Accordingly, there is a possibility that the ink suctioned from the ink ejection ports 142 is sucked into the ink ejection ports 142 for which the supply tube is not opened, through a surface on which the ink ejection ports 142 are formed. Accordingly, in a case when there is a difference in the opening time period, there is a possibility that so-called color mixing of inks occurs and the print quality decreases. The color mixing of inks is a phenomenon in which inks of different colors are mixed through the surface of the ink ejection ports of the printing head.

Accordingly, in the printing apparatus 1 of the present embodiment, the normal suction is performed with the choke valve set to the open state, before the execution of the choke suction in the initial filling, and the inks are suctioned by the normal suction to reach predetermined positions in the ink supply passages 155. The predetermined positions are positions including the portions of the tubes blocked by the choke valve 16 in the case of the present embodiment. Performing this operation first causes the portions of the tubes blocked by the choke valve 16 to be set to a state where the tubes are wetted by the inks (also referred to as wet state). Accordingly, the adhering of the blocked portions of the supply tubes 15 on the inner diameter side is suppressed.

Note that the adhering of the supply tubes 15 in the blocked portions caused by the choke valve 16 may occur not only in the pinch valve method, but also in any valve that uses flexible rubber or elastomer in general. For example, the adhering in the blocked portions may similarly occur in a diaphragm valve using rubber or elastomer.

FIG. 10 is a flowchart illustrating an example of processing of the CPU 201 in the initial filling of the inks. For example, the CPU 201 reads out a program stored in the ROM 202 to the RAM 203 and executes the program to implement the present flowchart. Moreover, the present flowchart is started, for example, a case when the printing apparatus 1 starts processing of the initial filling.

In S1001, the CPU 201 determines whether the suction caps 211 have closed the ink ejection ports 142. In a case when the suction caps 211 have not closed the ink ejection ports 142 (NO in S1001), in S1002, the CPU 201 executes processing such that the suction caps 211 close the ink ejection ports 142. In a case when the suction caps 211 have closed the ink ejection ports 142 (YES in S1001), the CPU 201 skips S1002, and proceeds to S1003.

In S1003, the CPU 201 determines whether the choke valve sensor 168 indicates that the state of the choke valve 16 is the open state (open). The printing apparatus 1 of the present embodiment is shipped with the choke valve 16 set to the open state. Accordingly, the choke valve sensor 168 before the initial filling should be indicating the open state. However, a case when the choke valve 16 is set to the closed state (closed) due to an erroneous manual operation by the user, or the like, is conceivable. Accordingly, the determination of the present step is performed.

In a case when the choke valve sensor 168 indicates the closed state (NO in S1003), in S1004, processing (opening processing) of driving the choke valve 16 to the open state is performed.

FIG. 11A is a flowchart for explaining the processing of driving the choke valve to the open state. Details of the processing of S1004 are described by using FIG. 11A. In S1101, the CPU 201 performs the processing of driving the choke valve 16 to the open state. In S1102, the CPU 201 determines whether the choke valve sensor 168 indicates that the state of the choke valve 16 is the open state. In a case when the choke valve sensor 168 indicates the open state (YES in S1102), the CPU 201 confirms that the sensor is in the open state, and terminates the processing of driving the choke valve to the open state. The CPU 201 then proceeds to S1005 of FIG. 10.

In a case when the choke valve sensor 168 indicates the closed state (NO in S1102), in S1103, the CPU 201 determines whether the number of times of executing the processing of driving the choke valve to the open state has exceeded a predetermined number of driving times (so-called the number of times of retry drive). Alternatively, the CPU 201 may determine whether a predetermined time period has elapsed from the first execution of the processing of setting the choke valve to the open state in S1101. In a case when the number of times of executing the processing has not exceeded the predetermined number of driving times (NO in S1113), the CPU 201 returns to S1101, and repeats the processing of S1101 to S1102. In a case when the number of times of executing the processing has exceeded the predetermined number of driving times (YES in S1103), there is a possibility that trouble such as a failure has occurred. Accordingly, the CPU 201 proceeds to S1014 of FIG. 10, and notifies the user of a choke sensor error.

Returning to FIG. 10, explanation of the flowchart continues. In a case when the CPU 201 confirms that the choke valve sensor 168 is in the open state in S1004, in S1005, the CPU 201 starts the drive of the suction pump 214. Since the choke valve 16 is in the open state in the present step, the operation of normal suction is started in the present step.

In S1006, the CPU 201 determines whether the drive of the pump has continued to a point where a drive amount of the pump reaches a drive amount Vn stored in advance. The drive amount Vn is a drive amount of the suction pump 214 at which the ink from each ink tank 17 reaches a position including a predetermined position by means of the normal suction. In the present embodiment, the predetermined position is a position including the portion of the tube blocked by the choke valve 16. The CPU 201 may determine whether the ink has reached the position including the predetermined position, based on a drive time period of the suction pump 214, or the like, instead of the drive amount Vn. As described above, the reaching of the ink to the predetermined position by means of the normal suction is achieved by driving the suction pump 214 of the recovery unit 21 by the predetermined drive amount or for the predetermined drive time period. The predetermined drive amount Vn or the predetermined drive time period can be determined in advance through calculation, experiments, and the like.

The CPU 201 may select the drive amount Vn or the drive time period to be used in the determination of the present step from multiple drive amounts or drive time periods stored in advance, depending on, for example, a physical property (for example, viscosity) of the ink used in the printing apparatus 1, ambient temperature, air pressure, or the like.

In a case when the drive amount of the suction pump reaches Vn (YES in S1006), in S1007, the CPU 201 stops the drive of the suction pump 214.

Then, in S1008, processing (blocking processing) of setting the choke valve 16 to the closed state is performed, and processing of the choke suction is started. In the present embodiment, the normal suction is executed before the execution of the choke suction, and the ink is made to reach the position including the blocked portion of each supply tube 15 before the execution of the processing of S1008. Accordingly, at the start of the processing of S1008, the blocked portion of the supply tube 15 is wet, and the adhering in the blocked portion of the supply tube 15 due to the choke suction is suppressed.

FIG. 11B is a flowchart for explaining processing of driving the choke valve to the closed state in S1008. Details of the processing of S1008 are described by using FIG. 11B.

In S1111, the CPU 201 performs the processing of driving the choke valve 16 to the closed state. In S1112, the CPU 201 determines whether the choke valve sensor 168 indicates that the state of the choke valve 16 is the closed state. In a case when the choke valve sensor 168 indicates the closed state (YES in S1112), the CPU 201 confirms that the sensor is in the closed state, and terminates the processing of driving the choke valve to the closed state. The CPU 201 then proceeds to S1009 of FIG. 10. In a case when the choke valve sensor 168 indicates the open state (NO in S1112), in S1113, the CPU 201 determines whether the number of times of executing the processing of driving the choke valve to the closed state has exceeded a predetermined number of driving times (so-called the number of times of retry drive). Alternatively, the CPU 201 may determine whether a predetermined time period has elapsed from the first execution of the processing of setting the choke valve to the closed state in S1111. In a case when the number of times of executing the processing has not exceeded the predetermined number of driving times (NO in S1103), the CPU 201 returns to S1111 and repeats the processing of S1111 to S1112. In a case when the number of times of executing the processing has exceeded the predetermined number of driving times (YES in S1113), there is a possibility that a trouble such as failure has occurred. Accordingly, the CPU 201 proceeds to S1014 of FIG. 10, and notifies the user of a choke sensor error.

Returning to FIG. 10, explanation of the flowchart continues. In a case when the CPU 201 confirms that the choke valve sensor 168 is in the closed state in S1008, in S1009, the CPU 201 starts the drive of the suction pump 214. Since the choke valve 16 is in the closed state in the present step, the operation of choke suction is started in the present step.

In S1010, the CPU 201 determines whether the drive of the pump has continued to a point where the drive amount of the pump reaches a drive amount Vc stored in advance. Driving the suction pump 214 until the drive amount reaches the drive amount Vc allows relatively high negative pressure of, for example, about −80 kPa to be applied to the ink ejection port 142 side. The CPU 201 may determine whether the suction pump 214 has been driven to the point where the pressure reaches the predetermined negative pressure, based on a drive time period of the suction pump 214 or the like, instead of the drive amount Vc.

The CPU 201 may select the drive amount Vc or the drive time period to be used in the determination of the present step from multiple drive amounts or drive time periods stored in advance, depending on, for example, the physical property (for example, viscosity) of the ink used in the printing apparatus 1, the ambient temperature, the air pressure, or the like.

In a case when the drive amount of the suction pump reaches Vc (YES in S1010), in S1011, the CPU 201 stops the drive of the suction pump 214. Then, in S1012, the processing of setting the choke valve 16 to the open state is performed. Since the processing of setting the choke valve 16 to the open state is the same as that in S1004, a description thereof is omitted.

In the present embodiment, the adhering in the blocked portion of the supply tube 15 due to the choke suction is suppressed. Accordingly, a case when the choke valve 16 is not set to the open state even if the CPU 201 performs the processing of setting the choke valve 16 to the open state after the choke suction is suppressed, and a case when the opening time in which the choke valve 16 is set to the open state varies is suppressed.

In a case when the choke valve sensor 168 is confirmed to be in the open state in S1012, in S1013, the CPU 201 determines whether a wait time period Tc has elapsed from the confirming of the open state. The wait time period Tc is a value stored in advance, and is a time period from the confirming of the choke valve 16 in the open state in S1012 to a point where the supply tube 15 and the printing head 14 are filled with the ink. In a case when the wait time period Tc elapses, the initial filling processing is terminated. The printing apparatus 1 is thus set to a state where the print operation can be started.

The CPU 201 may select the wait time period Tc to be used in the determination of the present step from multiple time periods determined in advance, depending on, for example, the physical property (for example, viscosity) of the used ink, the ambient temperature, the air pressure, or the like.

Note that the series of choke suction operations in the initial filling may be performed multiple times. For example, in a high-elevation region, an ink filling rate to the sub-tank in the choke suction is lower than that in a low-elevation region. In this case, an ink filling amount to the sub-tank can be secured by repeating the choke suction operations multiple times.

According to the present embodiment described above, a case when the blocking of the ink supply passage cannot be opened up after the execution of the choke suction can be suppressed.

Although the case of applying the method of the present embodiment to the initial filling is described in the flowchart of FIG. 10, the control method of the present embodiment is not limited to the application to the initial filling. Control similar to the flowchart of FIG. 10 can be applied to ink filling involving choke suction other than that in the initial filling.

Second Embodiment

In the first embodiment, description is given of the method in which the position that each ink is made to reach by the normal suction before the execution of the choke suction is set to be the portion blocked by the choke valve 16. In the present embodiment, a description is given of a method in which the position that the ink is made to reach in advance before the execution of the choke suction is set to a position downstream of the blocked portion to suppress squashing of the supply tube 15 in portions other than the blocked portion in the choke suction. In the present embodiment, differences from the first embodiment are mainly described. Portions that are not particularly described are configurations and processing that are the same as those in the first embodiment.

In a case when the choke valve 16 blocks the supply tube 15 and starts the choke suction, for example, relatively high negative pressure of about −80 kPa is applied to the ink ejection port 142 side via the suction cap 211. In t a case when the reaching position of the ink before the choke suction is near the portion blocked by the choke valve 16, since an interior of the supply tube 15 from the ink ejection ports 142 to the choke valve 16 is mostly air, pressure loss is very small. Accordingly, in a case when the reaching position of the ink before the choke suction is near the portion blocked by the choke valve 16, the negative pressure in the supply tube 15 is, for example, negative pressure of about −75 kPa, and has a value close to that of the negative pressure at the ink ejection ports 142. A difference from the negative pressure at the ink ejection ports 142 is pressure loss caused by air in the ink supply passage 155 upstream of the printing head 14.

FIGS. 12A and 12B are diagrams schematically illustrating the supply tube 15 and the printing head 14. FIG. 12A is a diagram schematically illustrating a state where the suction cap 211 is not in contact with the ink ejection ports 142 and is open, and the choke valve 16 is in the open state. Specifically, FIG. 12A is a diagram in a case when the choke suction is not performed. As illustrated in FIG. 12A, in a case when the choke suction is not performed, the supply tube 15 is not squashed and is in a normal state.

Meanwhile, FIG. 12B is a diagram illustrating a case when the choke valve 16 is in the closed state and the choke suction is executed in the closed state where the suction cap 211 is in contact with the ink ejection ports 142. FIG. 12B illustrates a state where the supply tube 15 is squashed over a certain range in a longitudinal direction. As described above, the supply tube 15 is flexible to achieve the functions of the tube, and tends to deform. Accordingly, in a case when high negative pressure is applied in the supply tube 15, there is a possibility that the supply tube 15 is squashed by the atmospheric pressure over a certain range in the longitudinal direction. There is a possibility that the squashing of the supply tube 15 occurs over an entire range from a vicinity of the joint portion 182 that is the connection portion with the head to the choke valve 16. In a case when the supply tube 15 is squashed in the choke suction as described above, blocking then occurs in portions other than the portion blocked by the choke valve 16, irrespective of whether the choke valve 16 is in the closed state or the open state. This causes the flow passage to become narrower and causes the communication state of the ink to become unstable, and there is a possibility that normal ink filling cannot be performed.

Forming the supply tube 15 by using a tube that is not squashed by the negative pressure in the choke suction is conceivable. In this case, it is necessary to select a harder material as the material of the supply tube 15 or to increase the thickness of the tube. Accordingly, in order to form the supply tube 15 by using the tube that is not squashed by the negative pressure in the choke suction, it is necessary to employ a condition in which the stiffness of the tube is increased in terms of qualitative property, that is a tube with less flexibility. In a case when the supply tube 15 is formed of the tube with less flexibility, the size of the printing apparatus 1 increases. Moreover, a degree of freedom in the configuration of the supply tube 15 decreases, and the manufacturing cost increases.

In the present embodiment, the CPU 201 controls the suction pump 214 such that the predetermined position that the ink is made to reach by the normal suction executed before the choke suction is, for example, a position including the filter 145 of the printing head 14. In the present embodiment, the drive amount Vn in S1006 of FIG. 10 is a drive amount at which the ink reaches the filter 145 of the printing head 14.

The filter 145 is formed of the net-shaped member having the mesh finer than foreign objects to trap the foreign objects as described above. Wetting the entire filter 145 with the ink generates pressure loss due to ink flow resistance at the fine mesh and meniscus force of the ink. Assume a situation where the ink is made to reach the position including the filter 145 before the choke suction. In a case when the negative pressure is applied by the choke suction to be, for example, −80 kPa near the ink ejection ports 142 in this situation, the negative pressure in the supply tube 15 is, for example, about −60 kPa. In the present embodiment, the absolute value of the negative pressure in the supply tube 15 can be thus made smaller than that of the negative pressure near the ink ejection ports 142. Accordingly, in the present embodiment, it is only necessary to employ a tube that can withstand −60 kPa and is not squashed at −60 kPa, as the supply tube 15, and does not have to employ the tube with less flexibility that can withstand −80 kPa. Thus, in the present embodiment, a tube with higher flexibility than that in the first embodiment can be selected as the supply tube 15.

Alternatively, the predetermined position that the ink is made to reach by the normal suction executed before the choke suction may be set to a position including the ink ejection ports 142. In this case, the drive amount Vn used for the determination in S1006 of FIG. 10 is a drive amount at which the ink reaches the ink ejection ports 142.

Since the ink ejection ports 142 are many fine holes, pressure loss is generated due to ink flow resistance generated by the fine holes forming the ink ejection ports 142 and meniscus force of the ink ejection ports 142. Moreover, the filter 145 upstream of the ink ejection ports 142 is in a state where it is wetted with the ink. Accordingly, a synergetic effect of both of the ink ejection ports 142 and the filter 145 being in the wet state allows the absolute value of the negative pressure in the supply tube 15 to be reduced from that in a case when the ink is made to reach the filter 145. Assume a situation where the ink is made to reach the position including the ink ejection ports 142 before the choke suction. In a case when the negative pressure is applied to be, for example, −80 kPa near the ink ejection ports 142 in this situation, the negative pressure in the supply tube 15 can be, for example, negative pressure of −50 kPa with a small absolute value.

In this case, it is only necessary to select a tube that can withstand −50 kPa and is not squashed at −50 kPa, as the supply tube 15, and does not have to select the tube with less flexibility that can withstand −80 kPa. Thus, in the present embodiment, a tube with even higher flexibility can be selected.

As described above, according to the present embodiment, it is possible to perform the choke suction while solving the squashing of the tube over a certain range in the longitudinal direction, without increasing the hardness, thickness, or the like, of the tube.

Third Embodiment

In the first embodiment, as a method of determining whether the ink has reached the predetermined position before the execution of the choke suction, there is described the method of performing determination based on the drive amount of the suction pump. In the present embodiment, a description is given of a method of determining whether the ink has reached the predetermined position by using a sensor. In the present embodiment, differences from the first embodiment are mainly described. Portions that are not particularly described are configurations and processing that are the same as those in the first embodiment.

FIG. 13 is a diagram schematically illustrating the ink supply passage. In the present embodiment, a description is given assuming that the predetermined position that the ink is made to reach before the choke suction is the portion blocked by the choke valve 16 as in the first embodiment. An ink reach sensor 30 is provided in the supply tube 15 forming the ink supply passage 155 of the present embodiment, as a unit that detects reaching of the ink to a portion downstream of the choke valve 16. The ink reach sensor 30 is, for example, an optical sensor such as a photo-interrupter. Moreover, the supply tube 15 of the present embodiment is made of a material with such a level of transparency that the reaching of the ink can be determined with the ink reach sensor 30. The ink reach sensor 30 is arranged such that a light axis center 30*a* of the ink reach sensor 30 passes the transparent supply tube 15. The ink reach sensor 30 can thus detect the reaching of the ink in the supply tube 15. The method of detecting presence or absence of the ink reaching is not limited to the optical sensor, and various known sensors and configurations can be applied.

FIG. 14 is a flowchart illustrating an example of processing in the present embodiment in the initial filling of the ink. Since S1401 to S1405 are the same as S1001 to S1005, a description thereof is omitted.

In the present embodiment, after the start of the normal suction, in S1406, the CPU 201 determines whether the ink reach sensor 30 has detected the ink. In the case where the ink reaches the light axis center 30*a* of the ink reach sensor 30, the CPU 201 determines that the ink reach sensor 30 has detected the ink. Since S1407 to S1414 are the same as S1007 to S1014, description thereof is omitted.

The ink reach sensor 30 is arranged, for example, for each of the supply tubes 151 to 154 for the respective colors. In this case, in S1406, the CPU 201 determines that the reaching of the inks has occurred in a case when all of the ink reach sensors 30 of the respective colors detect the inks. Specifically, the result of the ink reach sensor 30 that has detected the reaching of the ink latest among the ink reach sensors 30 of the respective colors is used in the determination of S1406. Accordingly, the ink reach sensor 30 may be arranged in the supply tube 15 forming the flow passage of a color for which the reaching of the ink is late, based on conditions such as the route length of the supply tube 15, the ink viscosity, and the like. For example, the ink reach sensor 30 may be arranged only in the supply tube 15 that forms the flow passage of a color for which the reaching of the ink is the latest. In a case when there are multiple flow passages in which the reaching of the ink may be the latest, the ink reach sensors 30 may be arranged in the supply tubes 15 forming these flow passages. Limiting the flow passages in which the ink reach sensors 30 are arranged as described above can reduce the number of the arranged ink reach sensors, and the manufacturing cost can be thus reduced.

Other Embodiments

Although multiple embodiments have been described above, the technique of the present disclosure is not limited to the aforementioned embodiments, and various combinations, changes, modifications, and the like, can be made without departing from the spirit or scope of the technique of the present disclosure.

According to the technique of the present disclosure, it is possible to suppress occurrence of troubles in suction.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present disclosure is not limited to the aforementioned embodiments, and various changes and modifications can be made without departing from the spirit or scope of the technique of the present disclosure. Accordingly, the following claims are added to make the scope of the present disclosure public.

The invention claimed is:

1. A printing apparatus comprising:

a tank configured to contain liquid to be supplied to a printing head that ejects the liquid from an ejection port;

a supply passage configured to supply the liquid from the tank to the printing head;

a suction unit configured to suction the liquid from the ejection port;

a valve provided at a first position in the supply passage and configured to be switchable between an open state in which the supply passage communicates and a closed state in which the supply passage is blocked; and a control unit configured to control the valve and the suction unit, wherein the control unit:

performs control of first suction in which the valve is set to the open state and the suction unit performs the suction, and the suction unit stops the suction when the liquid reaches the first position or a second position downstream of the first position, after the first suction is finished, performs control of second suction in which the valve is set to the closed state and the suction unit performs the suction, and after the second suction, performs control of setting the valve to the open state.

2. The printing apparatus according to claim 1, wherein, in a case when the printing apparatus is in a state where the liquid has not reached the first position from the tank, the control unit performs the control of the second suction after the first suction.

3. The printing apparatus according to claim 1, wherein the second position includes one of a position of a filter in the printing head and a position of the ejection port.

4. The printing apparatus according to claim 1, further comprising a detection unit configured to detect reaching of the liquid to the second position in the supply passage, wherein the control unit performs the control of the second suction after the detection unit detects the reaching of the liquid.

5. The printing apparatus according to claim 1, wherein the suction unit includes a pump used to perform the suction, and the control unit performs the control of the first suction by performing control of setting the valve to the open state and, then, driving the pump by a predetermined drive amount.

6. The printing apparatus according to claim 1, wherein the suction unit includes a pump used to perform the suction, and the control unit performs the control of the first suction by setting the valve to the open state and, then, driving the pump for a predetermined time period.

7. The printing apparatus according to claim 1, wherein the valve is set to the closed state by pressing a tube forming the supply passage and blocking the supply passage.

8. The printing apparatus according to claim 7, wherein the tube is formed of a flexible member.

9. The printing apparatus according to claim 1, further comprising a drive unit configured to be driven by control of the control unit and to switch the valve between the closed state and the open state.

10. The printing apparatus according to claim 1, wherein the valve is in the open state in shipping of the printing apparatus.

11. The printing apparatus according to claim 1, wherein, after the second suction is performed and the suction unit stops the suction, the control unit performs control of setting the valve to the open state.

12. The printing apparatus according to claim 1, further comprising a plurality of supply passages, wherein the valve opens and closes the plurality of supply passages.

13. A method of controlling a printing apparatus, the printing apparatus including a tank configured to contain liquid to be supplied to a printing head that ejects the liquid from an ejection port, a supply passage configured to supply the liquid from the tank to the printing head, a suction unit configured to suck the liquid from the ejection port, and a valve provided at a first position in the supply passage and configured to be switchable between an open state in which the supply passage communicates and a closed state in which the supply passage is blocked, the method comprising:

a first step of setting the valve to the open state and causing the suction unit to perform the suction and to stop the suction, when the liquid reaches the first position or a second position downstream of the first position;

a second step of setting the valve to the closed state and causing the suction unit to perform predetermined suction after the first step is finished; and a third step of setting the valve to the open state after the second step.

* * * * *